United States Patent
Sato et al.

(10) Patent No.: US 10,705,212 B2
(45) Date of Patent: Jul. 7, 2020

(54) OPTICAL SENSOR AND ELECTRONIC DEVICE

(71) Applicant: SHARP KABUSHIKI KAISHA, Sakai, Osaka (JP)

(72) Inventors: Hideki Sato, Sakai (JP); Yoshiki Ikuta, Sakai (JP); Takayuki Shimizu, Sakai (JP); Takuma Hiramatsu, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 31 days.

(21) Appl. No.: 16/147,735

(22) Filed: Sep. 29, 2018

(65) Prior Publication Data

US 2019/0146086 A1 May 16, 2019

(30) Foreign Application Priority Data

Nov. 14, 2017 (JP) ................. 2017-219263

(51) Int. Cl.
| | | |
|---|---|---|
| G01S 7/486 | (2020.01) | |
| G01S 17/02 | (2020.01) | |
| G01S 17/42 | (2006.01) | |
| H01L 31/02 | (2006.01) | |
| H01L 31/107 | (2006.01) | |
| G01S 17/04 | (2020.01) | |
| G01S 7/481 | (2006.01) | |
| G01S 17/10 | (2020.01) | |
| G01S 7/497 | (2006.01) | |
| G01S 7/487 | (2006.01) | |
| G01S 7/4865 | (2020.01) | |

(52) U.S. Cl.
CPC ............. *G01S 17/04* (2020.01); *G01S 7/487* (2013.01); *G01S 7/4813* (2013.01); *G01S 7/4865* (2013.01); *G01S 7/497* (2013.01); *G01S 17/10* (2013.01)

(58) Field of Classification Search
CPC ........ G01S 17/026; G01S 17/02; G01S 17/10; G01S 7/4813; G01S 7/4811; G01S 7/481; G01S 7/4865; G01S 7/483; G01S 7/487; G01S 7/4876; G01S 7/497; G01S 17/04
See application file for complete search history.

(56) References Cited

U.S. PATENT DOCUMENTS

| | | | |
|---|---|---|---|
| 2014/0231631 A1 | 8/2014 | Moore et al. | |
| 2016/0033644 A1* | 2/2016 | Moore | G01S 17/10 356/5.01 |
| 2019/0033433 A1* | 1/2019 | Ryu | G01S 7/4865 |
| 2019/0049585 A1* | 2/2019 | Gnan | G01S 17/89 |

(Continued)

FOREIGN PATENT DOCUMENTS

JP 6020547 B2 11/2016

*Primary Examiner* — John R Lee
(74) *Attorney, Agent, or Firm* — ScienBiziP, P.C.

(57) ABSTRACT

An optical sensor includes a time difference extraction circuit for extracting a time difference based on the distance to a target on the basis of a first received light pulse signal from a first light receiving unit, a reference cycle, and a second received light pulse signal from a second light receiving unit, and a determination circuit for determining whether a crosstalk value can be calculated on the basis of the time difference extracted by the time difference extraction circuit and the reference cycle.

7 Claims, 16 Drawing Sheets

(56) References Cited

U.S. PATENT DOCUMENTS

| | | | |
|---|---|---|---|
| 2019/0129015 A1* | 5/2019 | Ikuta | G01S 17/105 |
| 2019/0146086 A1* | 5/2019 | Sato | G01S 17/026 |
| | | | 250/206.1 |
| 2019/0235049 A1* | 8/2019 | Lai | G01S 7/2813 |
| 2019/0259902 A1* | 8/2019 | Shimizu | G01S 7/4863 |

* cited by examiner

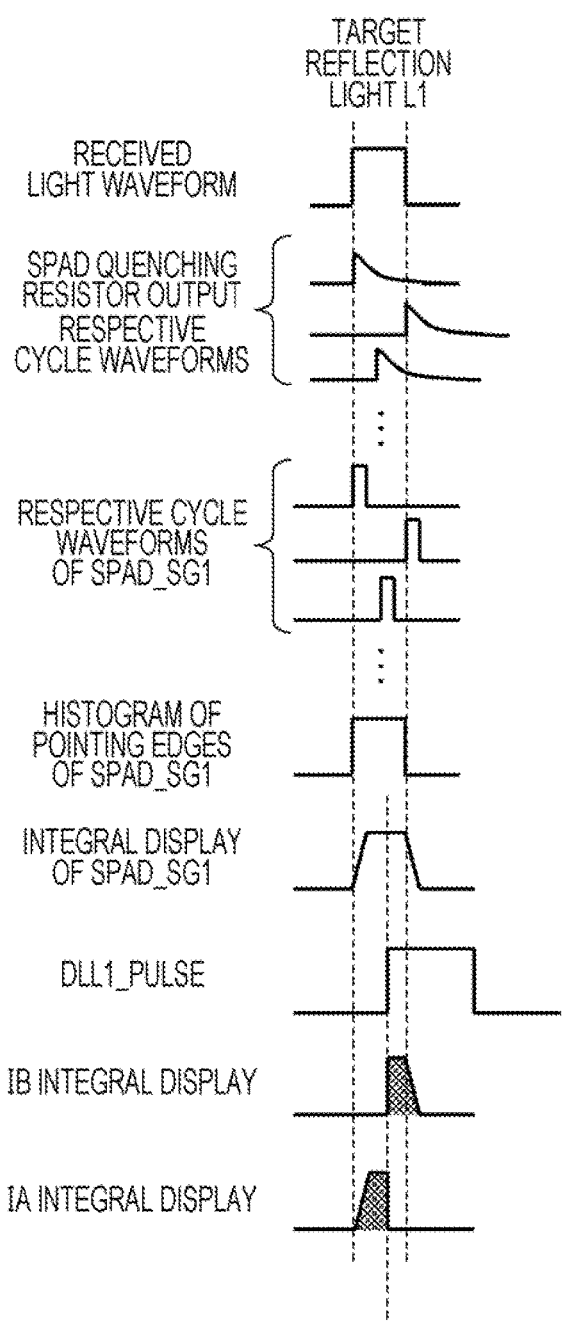
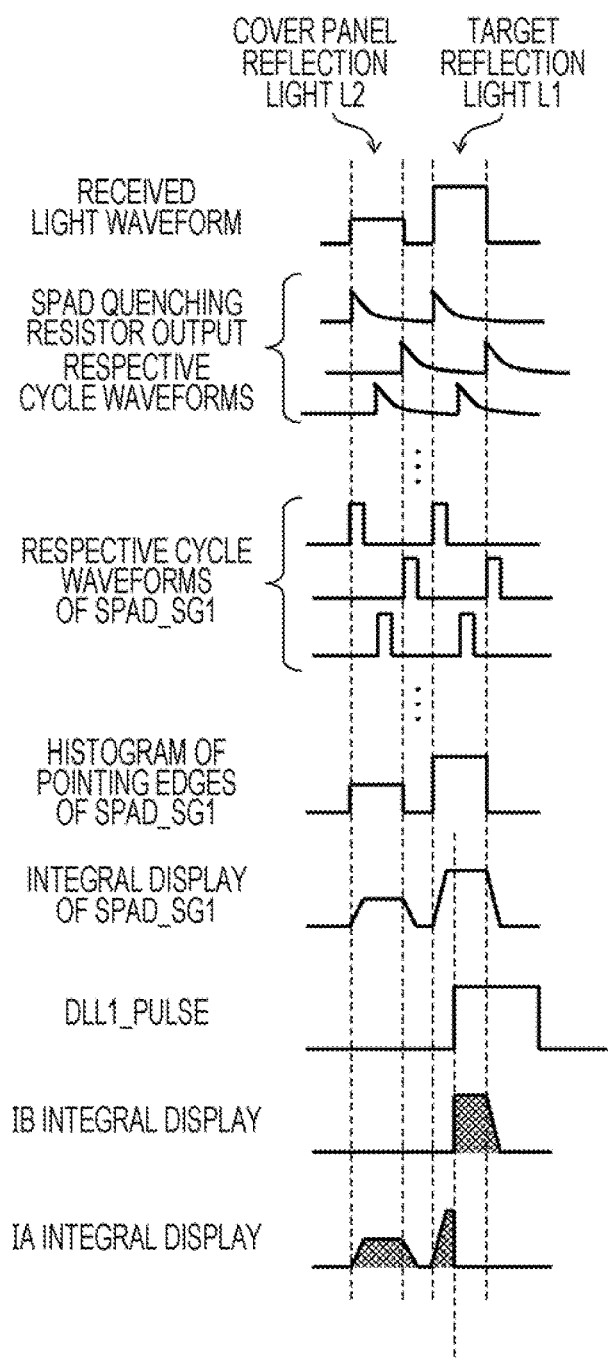

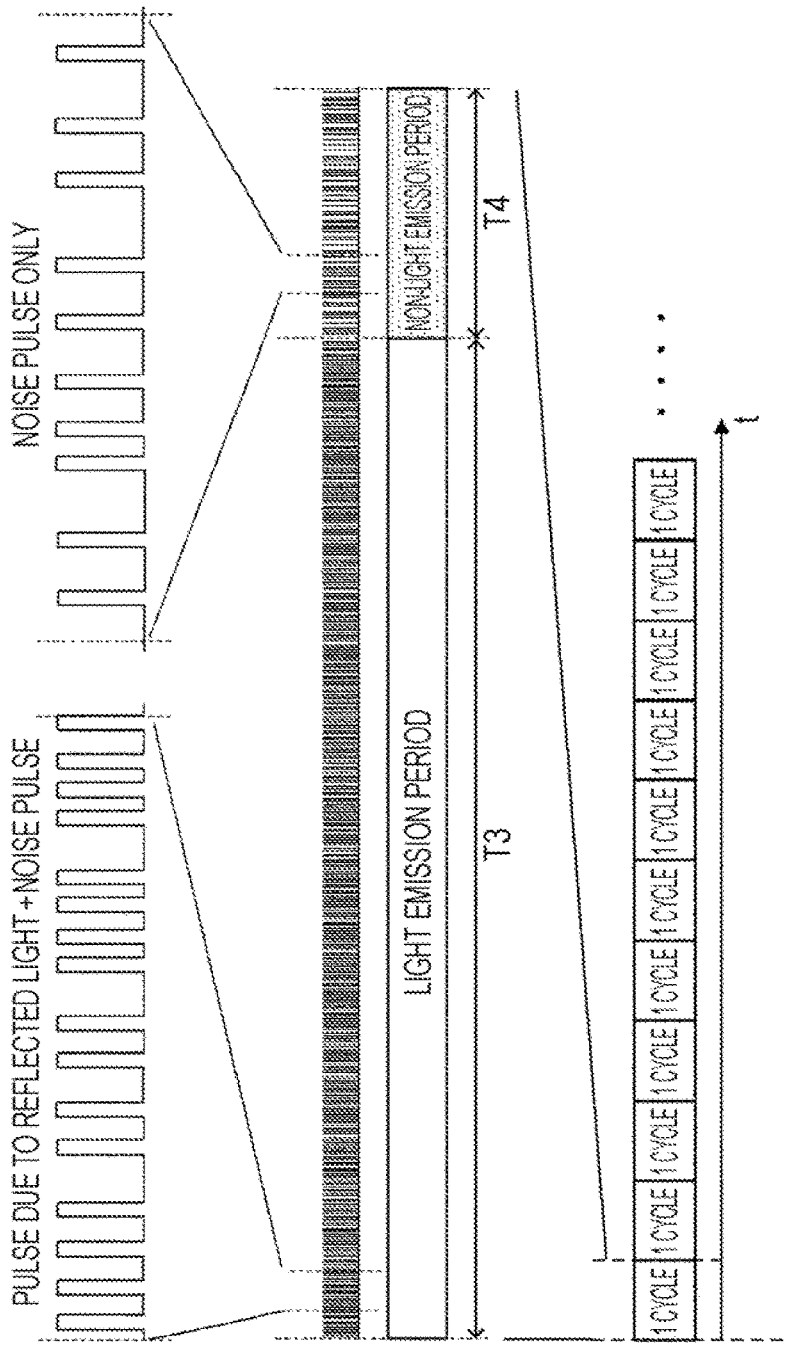
FIG. 5A OUTPUT PULSE FROM FIRST LIGHT RECEIVING UNIT 5 (ENLARGED VIEW)
FIG. 5B OUTPUT PULSE FROM FIRST LIGHT RECEIVING UNIT 5
FIG. 5C PERFORM MEASUREMENT OPERATION (PERFORMED n CYCLES)

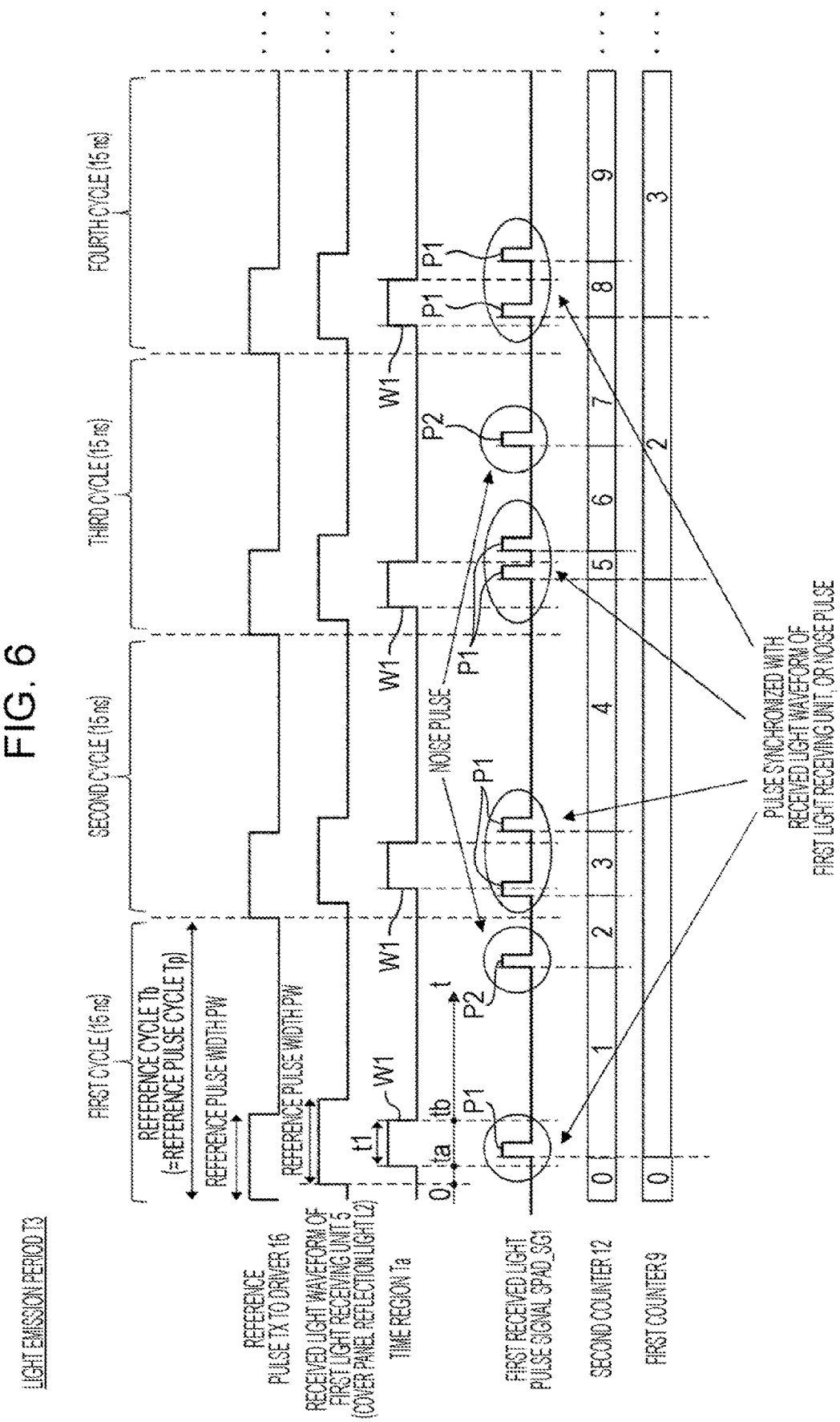

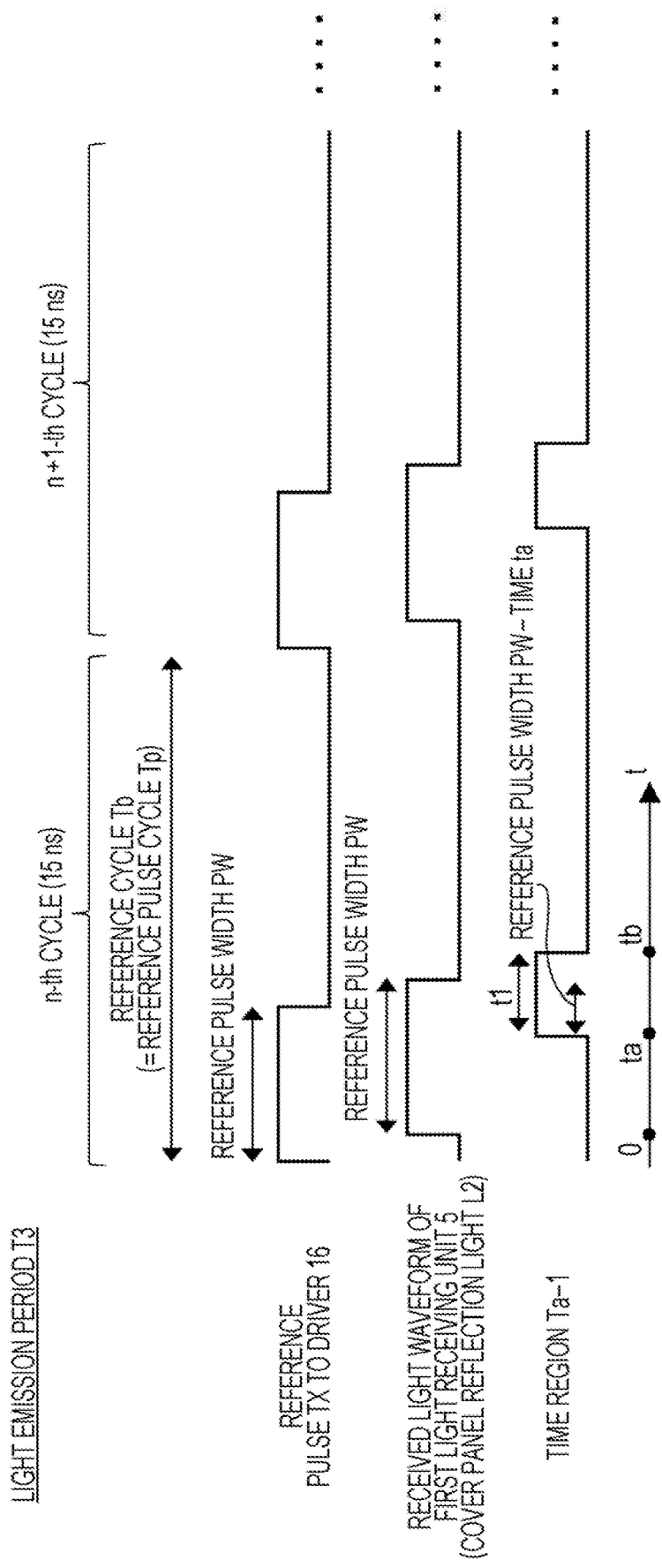

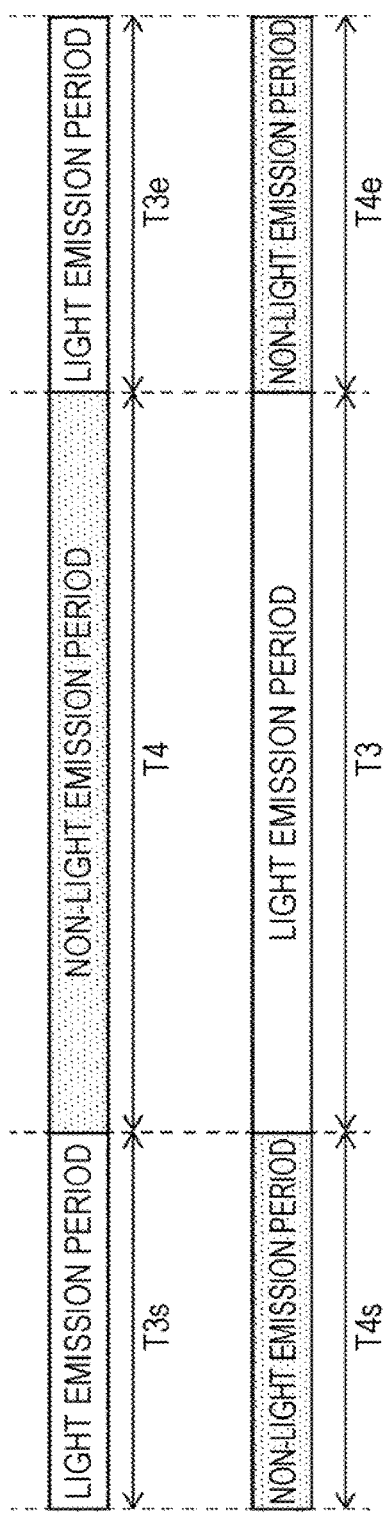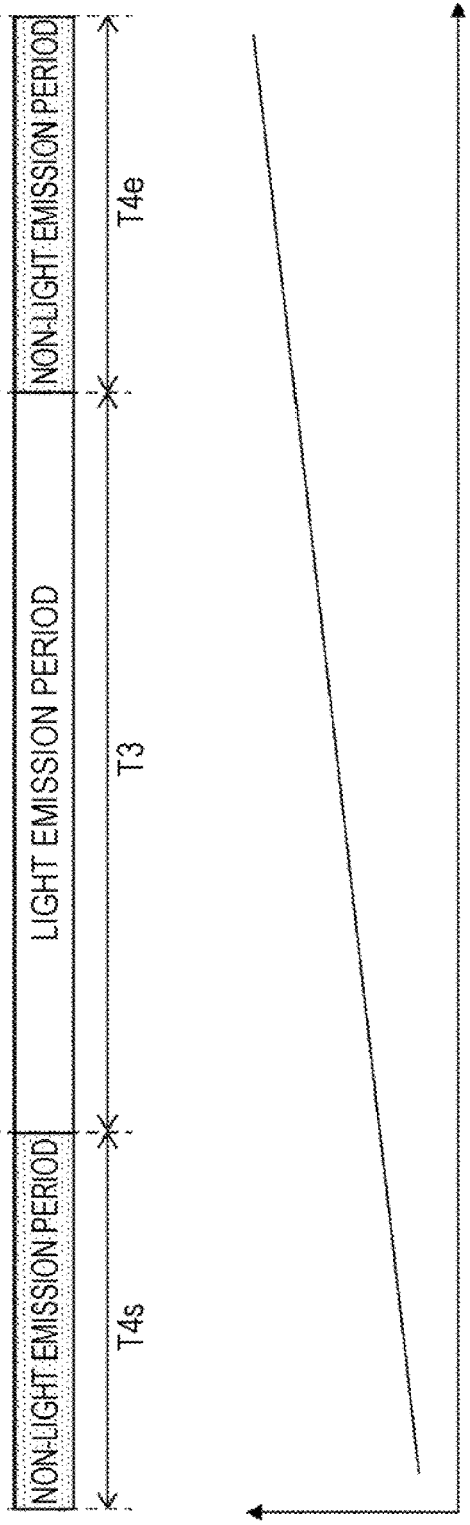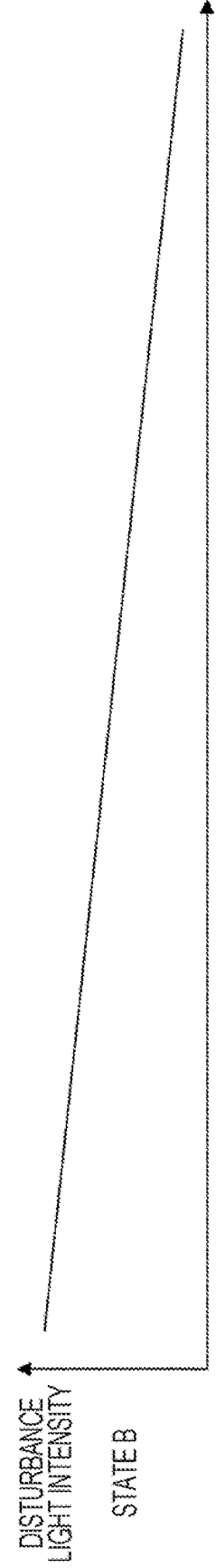

OPTICAL SENSOR AND ELECTRONIC DEVICE

BACKGROUND

1. Field

The present disclosure relates to an optical sensor and an electronic device for measuring a distance to a target based on time-of-flight (TOF) measurement.

2. Description of the Related Art

In the related art, a time-of-flight (TOF) technique in which an avalanche photodiode utilizing avalanche amplification (avalanche) effect of a photodiode is used as a light receiving element for detecting weak light at high speed is known (U.S. Patent Application Publication No. 2014/0231631 (published on Aug. 21, 2014) and Specification of Japanese Patent No. 6020547 (registered on Oct. 14, 2016)).

When a reverse bias voltage less than a breakdown voltage is applied, the avalanche photodiode operates in a linear mode and an output current fluctuates so as to have a positive correlation with respect to a received light amount. On the other hand, when a reverse bias voltage equal to or higher than the breakdown voltage is applied, the avalanche photodiode operates in a Geiger mode. In the Geiger-mode avalanche photodiode, an avalanche phenomenon occurs even when a single photon is incident and thus, a large output current can be obtained. For that reason, the Geiger-mode avalanche photodiode is called a single photon avalanche diode (SPAD).

A pulse output synchronized with incidence of photons can be obtained by adding a quenching resistor in series to the Geiger-mode avalanche photodiode.

FIG. 14 is a circuit diagram illustrating a configuration example of a light receiving unit using the Geiger-mode avalanche photodiode. The light receiving unit is constituted with of a photodiode PD11, an active quenching resistor R11 (resistance component of MOS transistor), and a buffer BUF11.

The photodiode PD11 is a Geiger-mode avalanche photodiode, and when a bias voltage higher than the breakdown voltage is applied, an avalanche phenomenon occurs in response to incidence of a single photon and a current flows. The current flows through the active quenching resistor R11 connected in series to the photodiode PD11 such that an inter-terminal voltage of the active quenching resistor R11 increases, and accordingly the bias voltage of the photodiode PD11 drops, and the avalanche phenomenon stops. When the current due to the avalanche phenomenon disappears, the light receiving unit returns to a state in which the inter-terminal voltage of the active quenching resistor R11 decreases and the bias voltage equal to or higher than the breakdown voltage is applied again to the photodiode PD11. With the buffer BUF11, a voltage change between the photodiode PD11 and the active quenching resistor R11 is taken out as a pulse output synchronized with incidence of photons.

The TOF sensor calculates a distance based on a time difference between the time when light is emitted to the target and the time when reflection light obtained as the emitted light is reflected from the target, is received so as to measure the distance between the TOF sensor and the target.

In U.S. Patent Application Publication No. 2014/0231631 (published on Aug. 21, 2014), a distance measuring method in which reflection light that is emitted from the light emitting element and reflected by the target and direct light from the light emitting element are input to two separate delay locked loop (DLL) circuits, respectively, and a phase delay amount between two DLL output pulses is converted into a digital value is disclosed.

In specification of Japanese Patent No. 6020547 (registered on Oct. 14, 2016), a method of measuring a distance by obtaining a maximum value of a histogram of output pulse frequencies from the SPAD is disclosed.

When the TOF sensor is mounted on an electronic device, the TOF sensor often includes cover panel that transmits a part of light emitted from the light emitting element and reflects the other part in the vicinity of a front surface of a light emitting-and-receiving surface of an optical sensor.

In the distance measurement method disclosed in U.S. Patent Application Publication No. 2014/0231631 (published on Aug. 21, 2014), since a light pulse from the light emitting element also becomes reflection light from the cover panel as well as reflection light from the detection target, in the DLL circuit to which a signal based on reflection light is input, a signal is input in a state where a signal based on the reflection light from a detection target and a signal based on the reflection light from the cover panel are mixed. For that reason, the DLL circuit within the TOF sensor erroneously recognizes that a detection target is present at the distance between a position of the detection target and a position of the cover panel (distance from the TOF sensor is substantially zero), and calculates an incorrect distance.

In the distance measurement method using the histogram disclosed in specification of Japanese Patent No. 6020547 (registered on Oct. 14, 2016), although it is possible to separate a signal component based on reflection light from the cover panel and a signal component based on reflection light from the detection target and to correctly measure the distance to the detection target, it is unfavorable in terms of resolution as compared with the DLL circuit system. In order to realize high resolution, since an emitted light pulse with a width close to resolution is demanded, and the number of bins in the histogram also increases, there is a defect that it becomes expensive due to a process and circuit scale.

In the distance measurement using the DLL circuit system, if it is possible to know an amount of reflection light component (crosstalk value) from the cover panel, it is possible to perform a calculation to correct an incorrect distance with a correct distance. However, since the crosstalk value varies depending on fingerprint contamination of the cover panel or the like, the crosstalk value is allowed to be updated periodically.

The crosstalk value is calculated by counting the number of SPAD output pulses of the reflection light component for a certain period in a state there is no reflection light component due to the detection target other than the reflection light component from the cover panel in front of the TOF sensor.

However, when the TOF sensor is used, the detection target often is present in front of the TOF sensor. In the state where the detection target is present in front of the TOF sensor, the crosstalk value may not be updated and the TOF sensor may not quickly follow fluctuation of the crosstalk value due to fingerprint contamination of the cover panel or the like.

It is desirable to provide an optical sensor and an electronic device capable of performing update of the crosstalk value even in a case where the detection target is present in front of the optical sensor and performing correct distance measurement even in a case where the cover panel is present.

SUMMARY

According to an aspect of the disclosure, there is provided an optical sensor which includes a reference pulse generation circuit that generates a reference pulse signal, a light emitting element that emits light toward a target based on the reference pulse signal, a cover panel that transmits a part of the light and reflects the other part, a photo-count type first light receiving element that is provided so as to receive target reflection light reflected by the target and cover panel reflection light reflected by the cover panel, a photo-count type second light receiving element that is disposed closer to the light emitting element than the first light receiving element and receives the cover panel reflection light, reflection light from inside a sensor package, and direct light from the light emitting element, a time difference extraction circuit that extracts a time difference based on a distance on a spatial light path to the target on the basis of a first received light pulse signal from the first light receiving element, a reference cycle based on the reference pulse signal, and a second received light pulse signal from the second light receiving element, and a determination circuit that determines, based on the time difference extracted by the time difference extraction circuit and the reference cycle, whether a crosstalk value representing a component amount of the cover panel reflection light is calculated.

BRIEF DESCRIPTION OF THE DRAWINGS

FIGS. 4A and 4B are waveform diagrams illustrating an operation of the first DLL circuit;

FIGS. 5A to 5C are views for explaining an operation state in a measurement period of the optical sensor, in which FIG. 5A is a waveform diagram illustrating a first received light pulse signal from a first light receiving unit, FIG. 5B is a waveform diagram illustrating the first received light pulse signal from the first light receiving unit in a light emission period and a non-light emission period, and FIG. 5C is a view for explaining the operation of the optical sensor based on a reference pulse signal in an actual measurement period;

FIG. 6 is a graph for explaining the operation of a first counter and a second counter, a first calculation circuit, and a second count calculation circuit which are included in the optical sensor illustrated in FIG. 1 in the light emission period;

FIGS. 8A and 8B are graphs for explaining a case where a proportion of a time domain in which the first light receiving unit receives reflected pulsed light from the cover panel in a time domain is different from that of the example in FIG. 6

FIGS. 10A and 10B are waveform diagrams of a locked state of the first DLL circuit, in which FIG. 10A illustrates a waveform diagram in a case where a time difference between a received light waveform of a reflection light component from the detection target and a received light waveform of a reflection light component from the cover panel is smaller than the half cycle of the reference cycle and FIG. 10B illustrates a waveform diagram in a case where the time difference between the received light waveform of the reflection light components is larger than the half cycle of the reference cycle;

FIGS. 12A to 12D are views for explaining a start light emission period, an end light emission period, a start non-light emission period, and an end non-light emission period of the optical sensor;

DESCRIPTION OF THE EMBODIMENTS

Hereinafter, embodiments of the disclosure will be described in detail.

Embodiment 1

Configuration of Optical Sensor 1

Figure 1:
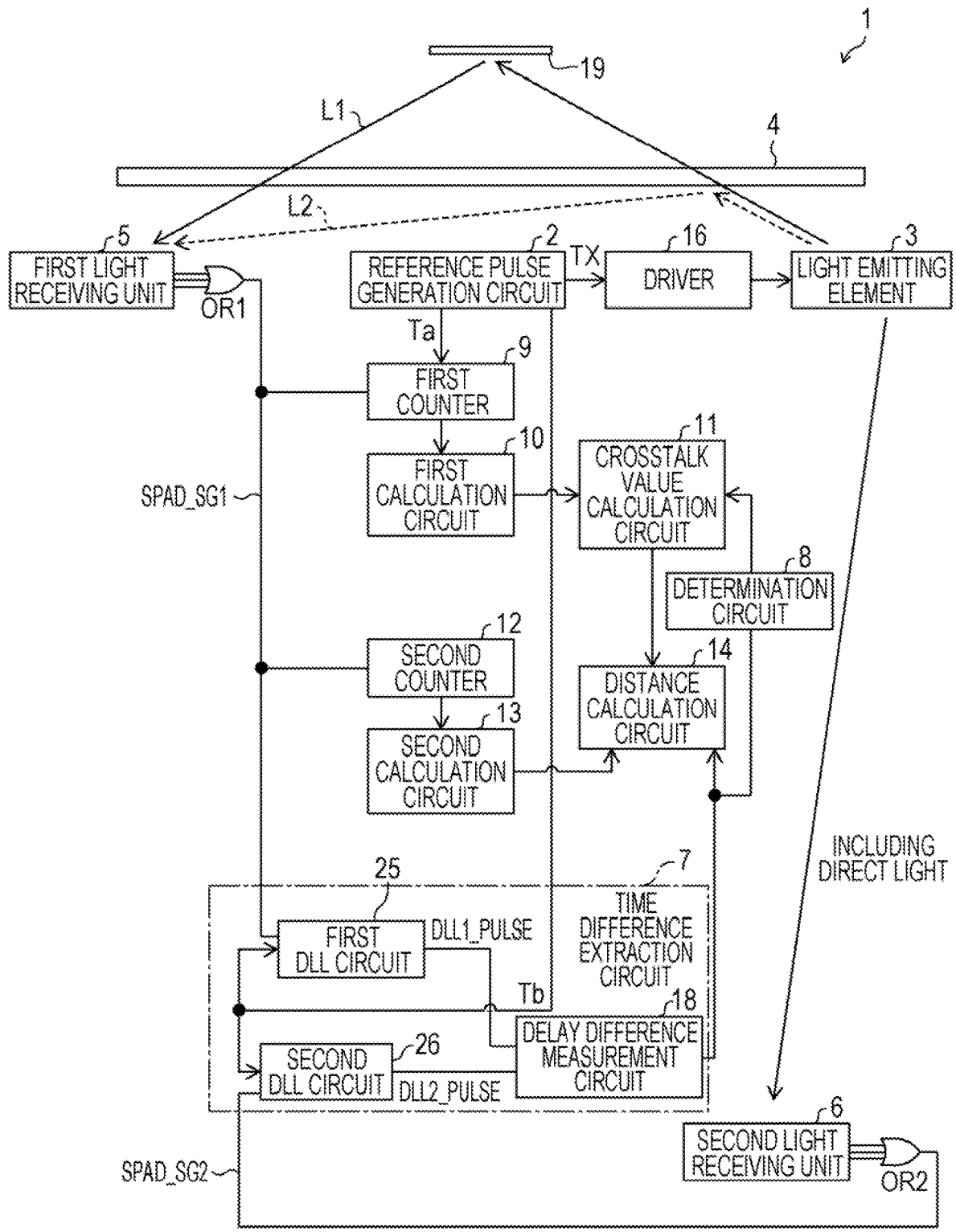
FIG. 1 is a block diagram schematically illustrating a configuration of an optical sensor according to Embodiment 1.

FIG. 1 is a block diagram schematically illustrating a configuration of an optical sensor 1 according to Embodiment 1. The optical sensor 1 includes a reference pulse generation circuit 2 for generating a reference pulse signal TX, a light emitting element 3 for emitting light toward a target 19 based on the reference pulse signal TX generated by the reference pulse generation circuit 2, a cover panel 4 which transmits a part of light emitted from the light emitting element 3 and reflects the other part thereof, and a photo-count type first light receiving unit 5 (first light receiving element) provided so as to be able to receive target reflection light L1 reflected by the target 19 and the cover panel reflection light L2 reflected by the cover panel 4. The reference pulse generation circuit 2 supplies the generated reference pulse signal TX to a driver 16. The driver 16 drives the light emitting element 3 with a pulse based on the reference pulse signal TX supplied from the reference pulse generation circuit 2.

In the optical sensor 1, a first counter 9 that calculates the number of first received light pulse signals SPAD_SG1 from the first light receiving unit 5 within a time width t1 of a time domain Ta within a reference pulse width PW including a part or all of a pulse width time domain in which the first light receiving element 5 receives cover panel reflection light L2 from the cover panel 4, a first calculation circuit 10 that calculates the third output pulse number C3 from the first light receiving element 5 due to incidence of the cover panel reflection light L2 based on the first output pulse number C1 from the first light receiving element 5 due to incidence of light including the cover panel reflection light L2 and disturbance light in a light emission period T3, the second output pulse number C2 from the first light receiving element 5 due to incidence of disturbance light in a non-light emission period T4, and a ratio between the light emission period T3 and the non-light emission period T4 of the light emitting element 3, and a crosstalk value calculation circuit 11 that calculates the crosstalk value based on the third output pulse number C3 are provided.

The crosstalk value calculation circuit 11 calculates the crosstalk value according to third output pulse number C3×(reference cycle Tb×reference pulse width PW/reference pulse cycle Tp)/(time width t1×x/100) when a proportion of the time domain in which the first light receiving element 5 receives the cover panel reflection light L2 is x % within the time width t1 of the time domain Ta.

The optical sensor 1 includes a photo-count type second light receiving unit 6 that is disposed closer to the light emitting element 3 than the first light receiving element 5 and receives the cover panel reflection light L2, reflection light from inside a sensor package, and direct light from the light emitting element 3, a time difference extraction circuit 7 that extracts a time difference based on a distance on a spatial light path to the target 19 on the basis of a first received light pulse signal SPAD_SG1 from the first light receiving element 5 and a reference cycle Tb based on the reference pulse signal TX and a second received light pulse signal SPAD_SG2 from the second light receiving element 6, and a determination circuit 8 that determines, based on the time difference extracted by the time difference extraction circuit 7 and the reference cycle Tb, whether it is possible to calculate a crosstalk value representing a component amount of the cover panel reflection light L2.

The time difference extraction circuit 7 includes a first DLL circuit 25 to which the first received light pulse signal SPAD_SG1 from the first light receiving unit 5 and the reference cycle Tb are input, a second DLL circuit 26 to which the second received light pulse signal SPAD_SG2 from the second light receiving unit 6 and the reference cycle Tb are input, and a delay difference measurement circuit 18 for extracting a time difference based on the distance on the spatial optical path to the target 19.

The target 19 is a detection target for detecting the distance between the target 19 and the optical sensor 1. However, the target 19 may be a non-detection target disposed in a direction in which the light emitted from the light emitting element 3 is directed. The non-detection target may be, for example, an object such as a wall or a chest disposed behind the detection target.

In the optical sensor 1, a second counter 12 that calculates the number of pulse outputs from the first light receiving unit 5, a second calculation circuit 13 that calculates the sixth output pulse number C6 from the first light receiving element 5 due to incidence of the cover panel reflection light L2 based on target reflection light L1 reflected by the target 19 in the light emission period T3, the fourth output pulse number C4 from the first light receiving element 5 due to incidence of light including the cover panel reflection light L2 and disturbance light in a light emission period T3, the fifth output pulse number C5 from the first light receiving element 5 due to incidence of disturbance light in a non-light emission period T4, and a ratio between the light emission period T3 and the non-light emission period T4 of the light emitting element 3, and a distance calculation circuit 14 that calculates a distance to the target 19 based on the sixth output pulse number C6 calculated by the second calculation circuit 13, the time difference extracted by the time difference extraction circuit 7, and the crosstalk value calculated by the crosstalk value calculation circuit 11 are further provided.

When the time domain Ta is in a time domain from time ta to tb (ta<tb) and satisfies tb≤reference cycle Tb/2≤(reference cycle Tb+time ta−reference pulse width PW) in a case where the time at which the first light receiving element 5 starts receiving the head of the pulsed light of the cover panel reflection light L2 is the starting point (0 sec) in each cycle of the reference pulse cycle Tp, the determination circuit 8 determines that crosstalk can be calculated in a case where the time difference t2 extracted by the time difference extraction circuit 7 is within the range of time tb≤t2≤reference cycle Tb+time ta−reference pulse width PW.

Operation of Optical Sensor 1

The optical sensor 1 having the configuration described above obtains the distance to the detection target 19 which reflects light from the light emitting element 3 as follows.

First, a case where the cover panel 4 is not present in the vicinity of the front surface of a light emitting-and-receiving surface relating to the light emitting element 3 and the first light receiving unit 5 provided in the optical sensor 1 will be described.

Pulsed light is emitted from the light emitting element 3. Then, target reflection light L1 from the target 19 to be detected is incident on the first light receiving unit 5 and reflection light (including direct light from the light emitting element 3) from inside a package of the optical sensor 1 is incident on the second light receiving unit 6. Then, a first received light pulse signal SPAD_SG1 is output from the first light receiving unit 5 and a second received light pulse signal SPAD_SG2 is output from the second light receiving unit 6 at a frequency according to the amount of the incident target reflection light L1 and reflection light from inside the package.

These first received light pulse signal SPAD_SG1 and the second received light pulse signal SPAD_SG2 are input to the time difference extraction circuit 7 as a pulse signal having a time difference corresponding to a difference in distance on the spatial light path. The second received light pulse signal SPAD_SG2 output from the second light receiving unit 6 can be regarded as having a distance on the spatial light path of approximately zero. For that reason, the time difference extraction circuit 7 uses the two inputs (first received light pulse signal SPAD_SG1 and second received light pulse signal SPAD_SG2) and the reference cycle Tb generated by the reference pulse generation circuit 2 to extract the time difference corresponding to a difference in distance on the spatial light path and the distance calculation circuit 14 calculates the distance to the target 19 to be detected.

For light reception based on light emission from the light emitting element 3, the first received light pulse signal SPAD_SG1 from the first light receiving unit 5 and the second received light pulse signal SPAD_SG2 from the second light receiving unit 6 occurs randomly in time within a light emission width. For that reason, the first DLL circuit 25 and the second DLL circuit 26, which are delay locked loop (DLL) circuits, are used in the time difference extraction circuit 7. The time difference is extracted by locking the output of the first DLL circuit 25 at the center of a received-light width of the first light receiving unit 5 and locking the output of the second DLL circuit 26 at the center of the light reception width of the second light receiving unit 6.

Configuration of First Light Receiving Unit 5

Figure 2:
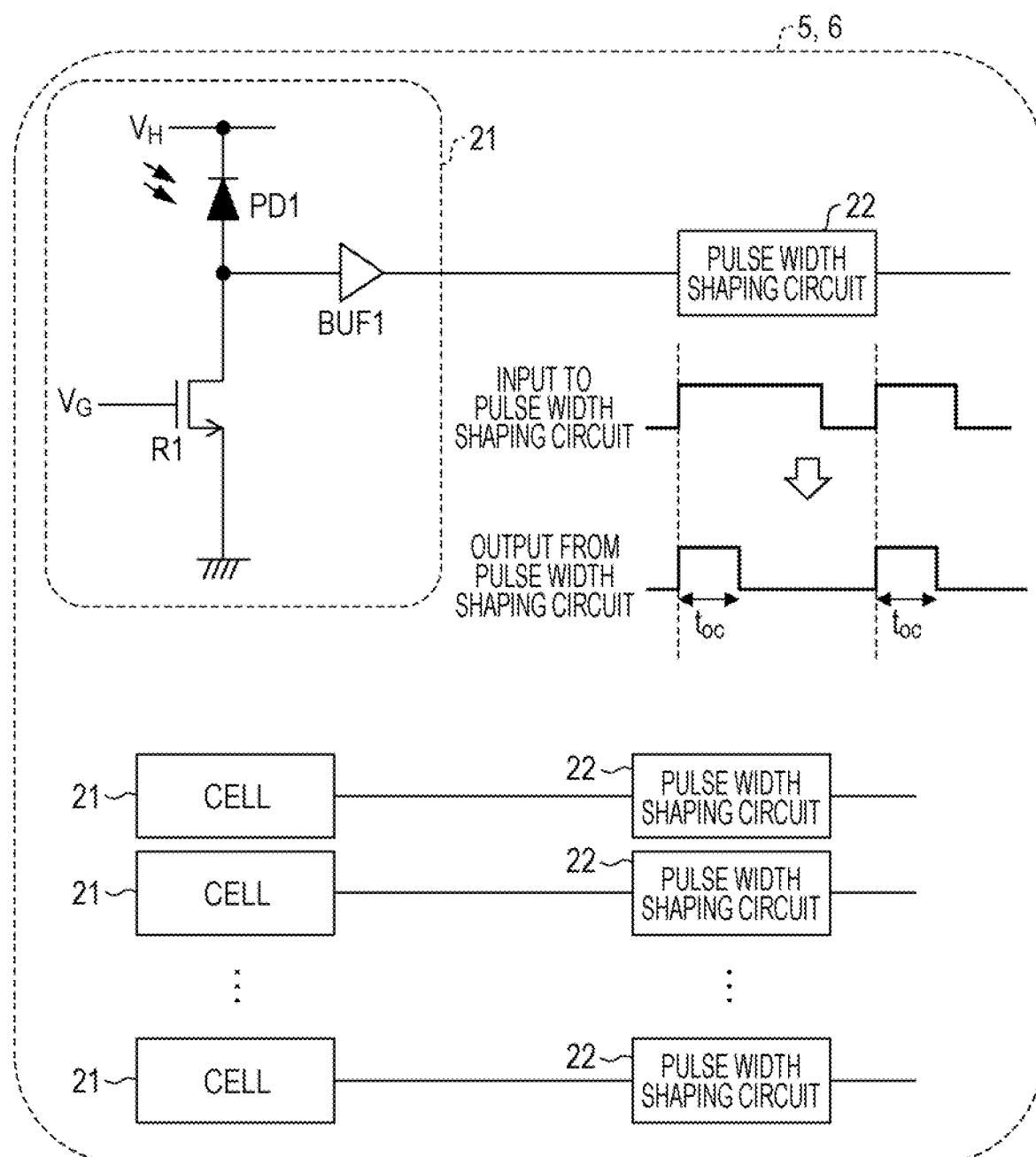
FIG. 2 is a circuit diagram schematically illustrating a configuration of a first light receiving unit provided in the optical sensor.

FIG. 2 is a circuit diagram schematically illustrating a configuration of the first light receiving unit 5 provided in the optical sensor 1. Here, since the first light receiving unit 5 and the second light receiving unit 6 have the same configuration, the first light receiving unit 5 will be described as an example.

As illustrated in FIG. 2, the first light receiving unit 5 includes a plurality of cells 21 each of which is constituted with a photodiode PD1, an active quenching resistor R1 (resistance component of a MOS transistor), and a buffer BUF1.

The photodiode PD1 is the Geiger-mode avalanche photodiode. A light amount of incident light incident on the photodiode PD1 is taken out as a pulse output (first received light pulse signal SPAD_SG1) by the active quenching resistor R1 and the active buffer BUF1. The pulse output from the first light receiving unit 5 passes through a pulse width shaping circuit 22, a pulse width of the pulse output is shaped into a fixed time width $t_{oc}$, and then an OR operation is performed in an arithmetic-logic operator OR1 (FIG. 1).

Configuration of First DLL Circuit 25

Figure 3:
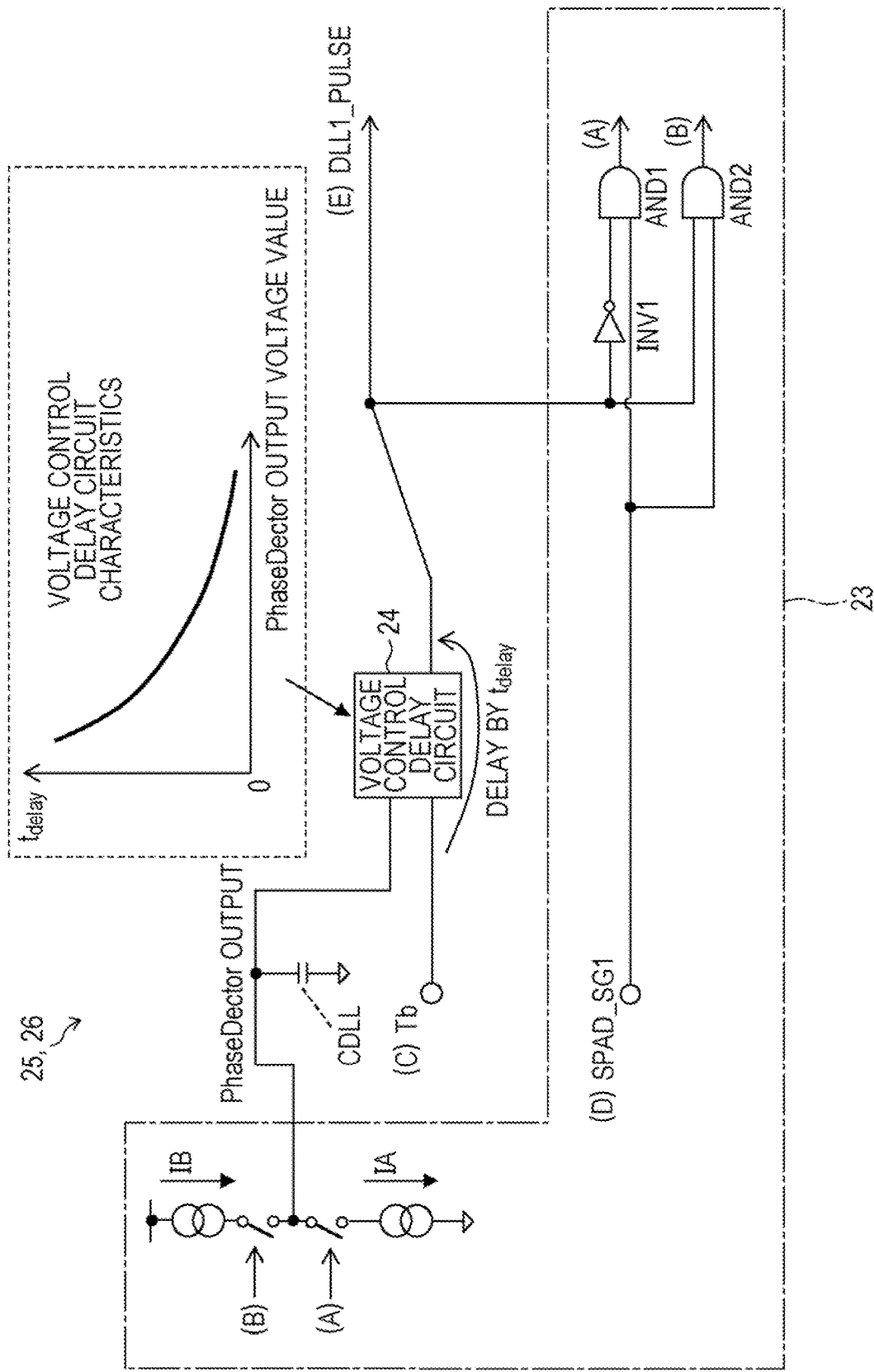
FIG. 3 is a circuit diagram schematically illustrating a configuration of a first DLL circuit provided in the optical sensor.

FIG. 3 is a circuit diagram schematically illustrating a configuration of the first DLL circuit 25 provided in the time difference extraction circuit 7 of the optical sensor 1. Since the first DLL circuit 25 and the second DLL circuit 26 have the same configuration, the first DLL circuit 25 will be described below. As illustrated in FIG. 3, the first DLL circuit 25 includes a phase detector 23, a voltage control delay circuit 24, and a capacitance element CDLL for holding a control voltage of the voltage control delay circuit 24.

In the phase detector 23, arithmetic-logic units AND1 and AND2 and an inverter INV1 are provided. It becomes that a signal (B)=1 by an arithmetic-logic operation by the arithmetic-logic unit AND2 when (E) delay signal DLL1_PULSE=1 supplied from the voltage control delay circuit 24 and (D) first received light pulse signal SPAD_SG1=1, and a current IB flows to the capacitor CDLL. It becomes that a signal (A)=1 by the arithmetic-logic operations by the arithmetic-logic unit AND1 and the inverter INV1 when (E) delay signal DLL1_PULSE=0 and (D) first received light pulse signal SPAD_SG1=1, and a current IA flows to the capacitor CDLL. According to the operation described above, an input voltage of the voltage control delay circuit 24 is determined by the voltage of the capacitive element CDLL, and (C) waveform obtained by delaying the reference cycle Tb (duty 50%) by $t_{delay}$ becomes (E) delay signal DLL1_PULSE.

In the case where the disturbance light component other than light reception (received light) originating from the light emitting element 3 is uniformly contained in (D) first received light pulse signal SPAD_SG1, since the current IA becomes equal to IB with sufficient time integration, the disturbance light component can be removed. The second DLL circuit 26 within the time difference extraction circuit 7 is also the same as the configuration of the first DLL circuit 25.

Operation of First DLL Circuit 25

FIGS. 4A and 4B are waveform diagrams illustrating the operation of the first DLL circuit 25. Since the operation of the first DLL circuit 25 and the operation of the second DLL circuit 26 are the same, the operation of the first DLL circuit 25 will be described as an example. FIG. 4A is a waveform diagram illustrating a locked state of the first DLL circuit 25.

As illustrated in FIG. 4A, for the waveform (received light waveform) when the first light receiving unit 5 receives the target reflection light L1, in the case where the rising edge of the delay signal DLL1_PULSE comes to a position where the waveform obtained by integrating waveforms of the randomly generated first received light pulse signal SPAD_SG1 is equally divided into two, an integrated value of IB in the IB integral display in FIG. 4A and an integrated value of IA in the IA display in FIG. 4A coincide with each other. For that reason, this state becomes the locked state.

Operation of Optical Sensor 1 in One Cycle of Measurement Operation

FIGS. 5A to 5C are views for explaining an operation state in a measurement period of the optical sensor 1, in which FIG. 5A is a waveform diagram illustrating the first received light pulse signal SPAD_SG1 from the first light receiving unit 5, FIG. 5B is a waveform diagram illustrating the first received light pulse signal SPAD_SG1 from the first light receiving unit 5 during a light emission period T3 and a non-light emission period T4, and FIG. 5C is a view for explaining the operation of the optical sensor 1 based on the reference pulse signal TX in the measurement period.

In one cycle of the measurement period, the light emission period T3 and the non-light emission period T4 are repeated in the light emitting element 3. FIG. 5B illustrates output pulses from the first light receiving unit 5 for one cycle of the measurement period, and FIG. 5A is a partial enlarged view of FIG. 5B. FIG. 5C illustrates the entire operation of n cycles of the measurement period. The second light receiving unit 6 also operates in the same manner.

As illustrated in FIG. 5B, the light emission period T3 and the non-light emission period T4 of the light emitting element 3 in one period of the measurement period are set so that the light emission period T3 is greater than non-light emission period T4. Further, as illustrated in FIG. 5C, in the optical sensor 1, the operation is repeated with one period as a period to be performed at a fixed time ratio (light emission period:non-light emission period=T3:T4) in the entire measurement period. It is desirable to set one cycle as short as possible to the extent that an environment in the light emission period T3 and the environment in the non-light emission period T4 do not change. In the first received light pulse signal SPAD_SG1 output from the first light receiving unit 5, a noise pulse due to disturbance light is also included in addition to an output pulse due to the reflection light component.

The Specifically, as illustrated in FIG. 5A, in the light emission period T3, a pulse mixed with the output pulse due to the reflection light component and the noise pulse due to the disturbance light is output from the first light receiving unit 5. In the non-light emission period T4, only the noise pulse is output from the first light receiving unit 5.

The second calculation circuit 13 illustrated in FIG. 1 calculates the number of pulses of one cycle acquired from the second counter 12 in the measurement period as follows. The second calculation circuit 13 subtracts a value obtained by multiplying the fifth output pulse number C5 acquired in the non-light emission period T4 by a prescribed time ratio (light emission period T3/non-light emission period T4) from the fourth output pulse number C4 acquired in the light emission period T3. That is, the second calculation circuit 13 calculates the number of pulses at the end of one cycle the sixth output pulse number C6) by $$C6 = C4 - C5 \times (T3/T4) \quad \text{(Expression 1)}.$$

The light emission period T3 and the non-light emission period T4 are continuously performed in a short period of one cycle against a change in the external environment such as disturbance light. The second term on the right side of (Expression 1) derives how many noise pulses occurred during the light emission period T3. By subtracting the value obtained by multiplying the fifth output pulse number C5 by the coefficient (T3/T4) of the prescribed time ratio from the fourth output pulse number C4, only pulses due to the target reflection light L1 in the light emission period T3 can be obtained. It is also preferable that the light emission period T3 is set to be greater than the non-light emission period T4. With this, it is possible to increase the ratio of the light emission period T3 in which the light emitting element 3 repeats pulsed light emission in one cycle, so that it is possible to reduce time loss caused by the non-light emission period T4 in which only the noise pulse is generated.

n cycles are performed within the measurement period and the sixth output pulse number C6 by the second calculation circuit 13 at the end of n cycles is calculated by the following (Expression 2).

$$\sum_{k=1}^{n} \{C4\_k - C5\_k \times (T3/T4)\}$$ (Expression 2)

Here, $C4\_k$ represents the fourth output pulse number C4 acquired in the light emission period T3 in the k-th cycle, and $C5\_k$ represents the fifth output pulse number C5 acquired in the non-light emission period T4 in the k-th cycle. As the number of pulses is added by the second calculation circuit 13, the number of output pulses (sixth output pulse number C6) by the component of the target reflection light L1 at the end of n cycles is computed.

Next, a case where the cover panel 4 is present in the vicinity of the front surface of the light emitting-and-receiving surface of the optical sensor 1 will be described.

FIG. 4B is a waveform diagram of the locked state of the first DLL circuit 25. As illustrated in FIG. 4B, the waveform (received light waveform) at the time when the first light receiving unit 5 receives light contains two waveforms of a waveform representing the component of the cover panel reflection light L2 from the cover panel 4 and a waveform representing the component of the target reflection light L1 from the target 19 to be detected, and is a pulse output which is shifted by the time corresponding to a difference in the distance on the spatial optical path.

In the case where the rising edge of the delay signal DLL1_PULSE comes to a position where the waveform obtained by integrating waveforms of the randomly generated with respect to the received light waveform first received light pulse signal SPAD_SG1 is equally divided into two, an integrated value of IB in the IB integral display in FIG. 4B and an integrated value of IA in the IA display in FIG. 4B coincide with each other. For that reason, this state becomes the locked state.

The waveform (received light waveform) when the second light receiving unit 6 receives light is a waveform which contains two waveforms of a waveform representing the component of the cover panel reflection light L2 from the cover panel 4 and a waveform representing component (including direct light) of the reflection light from the inside of the sensor package. However, since the distances on the spatial light path are both substantially equal to 0, the waveforms are equal to the received light waveforms in FIG. 4A.

FIG. 4B illustrates matters that the rising edge position of the delayed signal DLL1_PULSE in the locked state of the first DLL circuit 25 is different depending on the magnitude of the component of the cover panel reflection light L2 from the cover panel 4 and the component of the target reflection light L1 from the target 19 to be detected (position of the first DLL circuit 25 in the locked state is equal), and correct time difference extraction may not be performed.

In order to perform correct time difference extraction, the position of the locked state of the first DLL circuit 25 is allowed to be estimated when the cover panel 4 is not present. For that purpose, the sixth output pulse number C6 due to the reflection light component (including components of the cover panel reflection light L2 and target reflection light L1) calculated by the second calculation circuit 13 and a count value (crosstalk value) of the component of the cover panel reflection light L2 from the cover panel 4 need to be known.

When the determination circuit 8 to be described later determines that the crosstalk value can be calculated, the crosstalk value calculation circuit 11 updates the previously stored crosstalk value with the crosstalk value calculated by the crosstalk value calculation circuit 11. With this, the distance calculation circuit 14 can use the crosstalk value which is in the latest state of the cover panel 4.

Crosstalk Value Calculation Method

A case where a reference pulse cycle Tp of the reference pulse signal TX is equal to the reference cycle Tb will be described. First, the operation of the optical sensor 1 in the light emission period T3 in the case where a target other than the cover panel 4 is not present in front of the optical sensor 1 will be described.

FIG. 6 is a graph for explaining the operation of the first counter 9, the second counter 12, the first calculation circuit 10, and the second calculation circuit 13 provided in the optical sensor 1 illustrated in FIG. 1 in the light emission period T3.

The reference pulse generation circuit 2 included in the optical sensor 1 illustrated in FIG. 1 gives the reference pulse TX to the driver 16 and causes the light emitting element 3 to emit a light pulse. The reference pulse cycle Tp of the reference pulse TX output by the reference pulse generation circuit 2 to the driver 16 and the reference cycle Tb output by the reference pulse generation circuit 2 to the time difference extraction circuit 7 may be the same cycle. In this embodiment, description will be made on the assumption that the reference pulse cycle Tp and the reference cycle Tb are the same cycle.

As illustrated in FIG. 6, since the component of the cover panel reflection light L2 (received light waveform of first light receiving unit 5) from the cover panel 4 is delayed by light emission delay of the light emitting element 3 due to reception delay of the reference pulse TX, the component takes a waveform delayed by a fixed time for the reference pulse TX.

A case where the time domain Ta (time width t1) within the reference pulse cycle Tp including a part of the received light waveform (pulse width time domain) of the pulse component of the cover panel reflection light L2 from the cover panel 4 of the first light receiving unit 5 is present in the time domain from time ta to time tb (time ta<time tb) when the time to start receiving leading pulsed light of the cover panel reflection light L2 is set as the starting point (0 sec) is considered.

As illustrated in FIG. 6, the second counter 12 counts rising of the first received light pulse signal SPAD_SG1 from the first light receiving unit 5 in the entire region of the light emission period T3 (fourth output pulse number C4).

As illustrated in FIG. 6, using the waveform W1 in which the time domain Ta is at the High voltage, the first counter 9 counts the rising edge of the first received light pulse signal SPAD_SG1 from the first light receiving unit 5 in the time domain Ta of the light emission period T3 (first output pulse number C1).

As illustrated in FIG. 6, the pulse P1 of the first received light pulse signal SPAD_SG1 from the first light receiving unit 5, which is generated within the time domain of the received light waveform of the first light receiving unit 5, includes a pulse (pulse by the cover panel reflection light L2) synchronized with the received light waveform of the first light receiving unit 5 and a noise pulse not synchronized with the received light waveform of the first light receiving unit 5 which is generated by disturbance light or the thermally generated carrier.

The pulse P2 of the output pulse (SPAD_SG1) from the first light receiving unit 5, which is generated outside the time domain of the received light waveform of the first light receiving unit 5, is a noise pulse not synchronized with the received light waveform of the first light receiving unit 5 which is generated by disturbance light or the thermally generated carrier.

The first output pulse number C1 obtained from the first counter 9 in the light emission period T3 and the fourth output pulse number C4 obtained from the second counter 12 are in a state where noise pulses generated by incidence of light including the cover panel reflection light L2 and disturbance light are mixed, and it is not possible to distinguish between pulses synchronized with the received light waveform of the first light receiving unit 5 and noise pulses. However, it is possible to distinguish between the pulses and the noise pulses by using the count value of the counter in a non-light emission period T4 to be described later.

Next, the operation of the optical sensor 1 in the non-light emission period T4 in the case where a target other than the cover panel 4 is not present in front of the optical sensor 1 will be considered.

Figure 7:
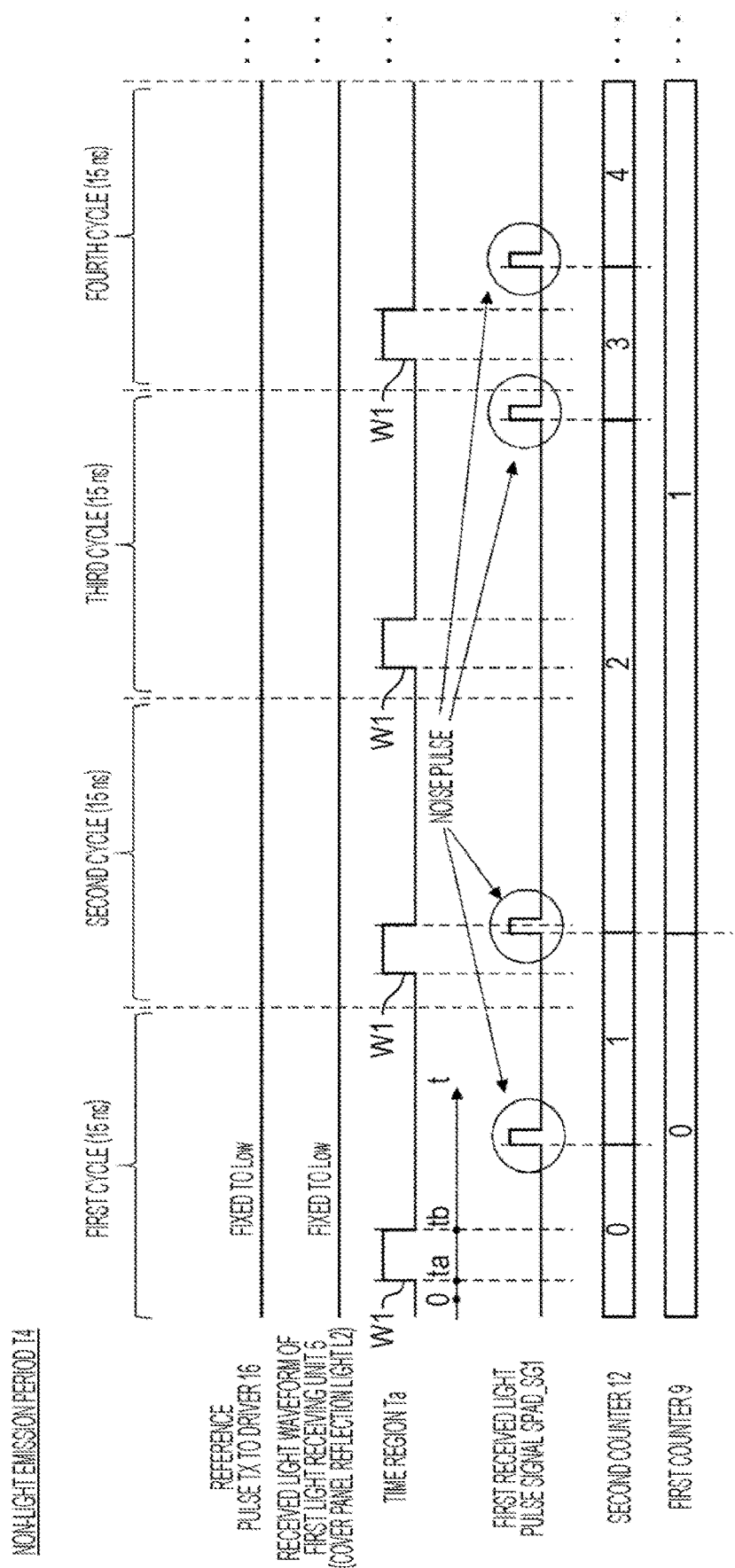
FIG. 7 is a graph for explaining the operation of the first and second counters and the first and second count calculation circuits which are included in the optical sensor illustrated in FIG. 1 in the non-light emission period.

FIG. 7 is a graph for explaining the operation of the first counter 9, the second counter 12, the first calculation circuit 10, and the second calculation circuit 13 provided in the optical sensor 1 illustrated in FIG. 1 in the non-light emission period T4 (description will be made on a state where a target other than the cover panel 4 is not present). In the non-light emission period T4, the reference pulse TX to the driver 16 is fixed to Low, the light emitting element 3 is not made to emit light, and the same operation as in the light emission period T3 is performed. The ratio between the measurement time in the light emission period T3 and the measurement time in the non-light emission period T4 may be a prescribed ratio.

As illustrated in FIG. 7, the second counter 12 counts rising of the first received light pulse signal SPAD_SG1 from the first light receiving unit 5 in the entire region of the non-light emission period T4 (fifth output pulse C5).

As illustrated in FIG. 7, using the waveform W1 in which the time domain Ta is at the High voltage, the first counter 9 counts the rising edge of the first received light pulse signal SPAD_SG1 from the first light receiving unit 5 in the time domain Ta of the non-light emission period T4 (second output pulse number C2).

Since the pulse synchronized with the received light waveform of the first light receiving unit 5 is not present and only the noise pulse is generated, the pulse generation frequency of the first light receiving pulse signal SPAD_SG1 from the first light receiving unit 5 becomes lower than the light emission period T3 illustrated in FIG. 6.

The count value of the non-light emission period T4 is subtracted from the count value of the light emission period T3 based on the ratio between the light emission period T3 and the non-light emission period T4, and the number of output pulses (sixth output pulse number C6) from the first light receiving unit 5 due to incidence of the cover panel reflection light L2 in the entire region of the light emission period T3 and the number of output pulses (third output pulse number C3) due to incidence of the cover panel reflection light L2 within the time domain Ta of the light emission period T3 from the first light receiving unit 5 according to the following equation are calculated.

Since it is considered that noise pulses generated by disturbance light or thermally generated carriers occur evenly over time, when it is assumed that a light emission period is T3 and a non-light emission period is T4, it is set that third output pulse number C3=first output pulse number C1−second output pulse number C2×T3/T4 and sixth output pulse number C6=fourth output pulse number C4−fifth output pulse number C5×T3/T4, thereby capable of removing noise pulses included in the first output pulse number C1 and the fourth output pulse number C4 and calculating the third output pulse number C3 and the sixth output pulse number C6.

As another method of calculating the third output pulse number C3, in the case of a configuration in which the calculation result of the second calculation circuit 13 can be used by the first calculation circuit 10, it is possible to assume that third output pulse number C3=first output pulse number C1−fifth output pulse number C5×(T3/T4)×(time width t1/reference pulse cycle Tp). Since the fifth output pulse number C5 is larger than the second output pulse number C2, in a case where the measurement period is short and variation in the count value may not be ignored, improvement in calculation accuracy can be expected.

In FIGS. 6 and 7, although only the first cycle to the fourth cycle are illustrated, the light emission period T3 is about 6.8 ms, the non-light emission period T4 is about 1.7 ms, the cycle of the received light waveform of the first light receiving unit 5 is 15 ns, the light emission period T3 includes about 450 thousand cycles of the received light waveform, and the non-light emission period T4 includes about 110 thousand cycles of the received light waveform.

In FIGS. 6 and 7, for the sake of explanation, detection frequency of the first received light pulse signal SPAD_SG1 from the first light receiving unit 5 is written many times. Actually, however, the pulse generation number of the component of the cover panel reflection light L2 corresponds to a detection frequency which is as low as several tens to several hundreds of counts during 6.8 ms. (In a case where the target 19 to be detected is present, the pulse generation number of the component of the target reflection light L1 depends on the distance. The pulse generation number is about 0 to several tens of thousands of counts.) In a case where the count value of the third output pulse number C3 is all the component of the cover panel reflection light L2, if the proportion x % of the time domain in which the first light receiving unit 5 receives pulsed light of the cover panel reflection light L2 is known within the time width t1 of the time domain Ta (100% in this embodiment. Since the reference pulse width PW of the received light waveform of the first light receiving unit 5 is present so as to cover the time width t1 of the time domain Ta), the ratio of the third output pulse number C3 to the count value of the pulse component of the cover panel reflection light L2 in the whole region of the light emission period T3 can be known and thus, the crosstalk value calculation circuit 11 can calculate the crosstalk value according to third output pulse number $$C3\times(\text{reference cycle } Tb\times\text{reference pulse width } PW/\text{reference pulse cycle } Tp)/(\text{time width } t1\times x/100) \quad \text{Expression (3)}$$

(reference pulse width PW/reference pulse cycle Tp corresponds to light emission duty).

However, whether or not the count value of the third output pulse number C3 is all the component of the cover panel reflection light L2 (whether or not the count value includes the reflection light component from the target 19 to be detected in addition to the reflection light component from the cover panel 4) may not be determined from the count value. For that reason, calculation of the crosstalk value by Expression (3) is not allowed.

Figure 8B:
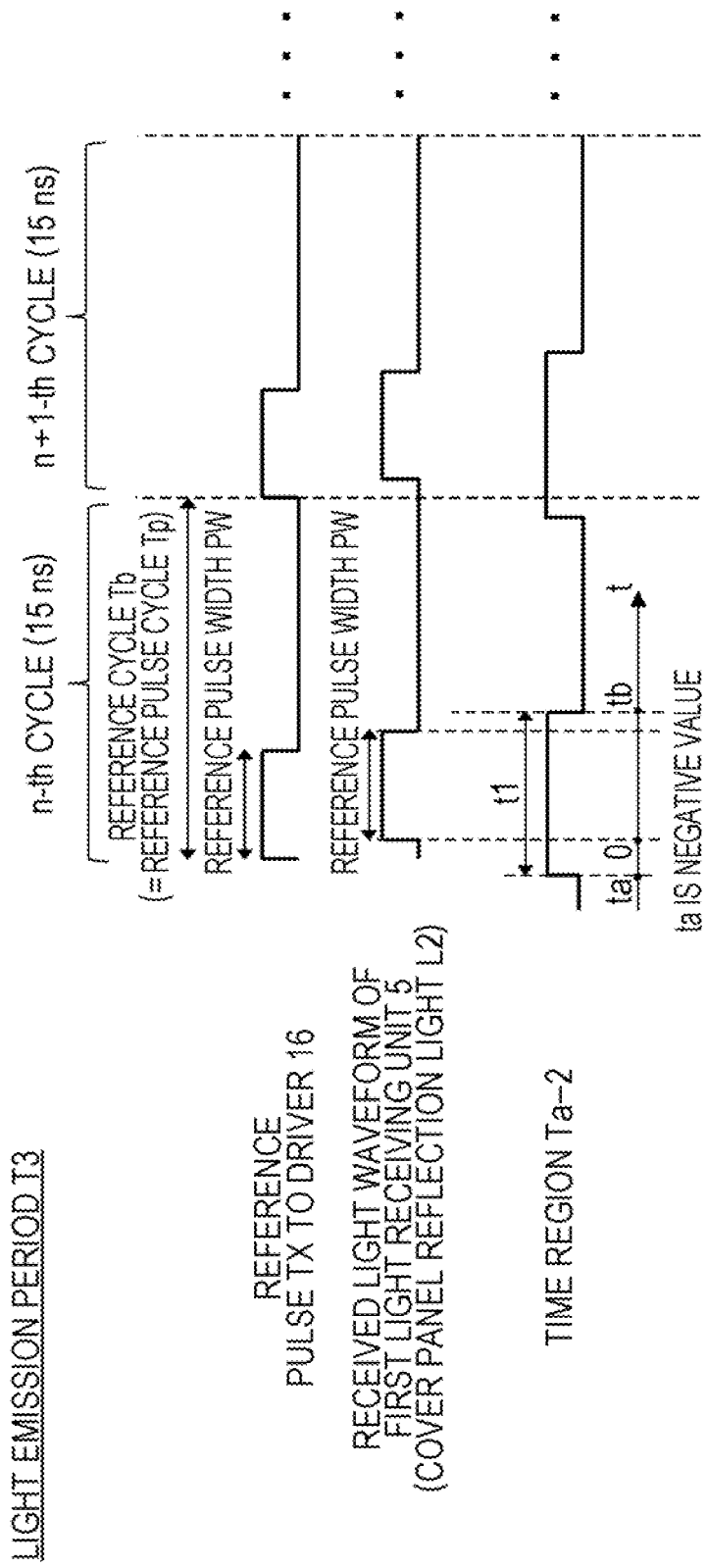

FIGS. 8A and 8B illustrate the case where the proportion of the time domain in which the first light receiving unit 5 receives the cover panel reflection light L2 in the time domain Ta is different from the proportion in the example of FIG. 6 described above.

In the case of time domain Ta-1 illustrated in FIG. 8A, x=(reference pulse width PW−time ta)/time width t1×100, and in the case of time domain Ta-2 illustrated in FIG. 8B x=(reference pulse width PW)/time width t1×100.

Figure 8C:
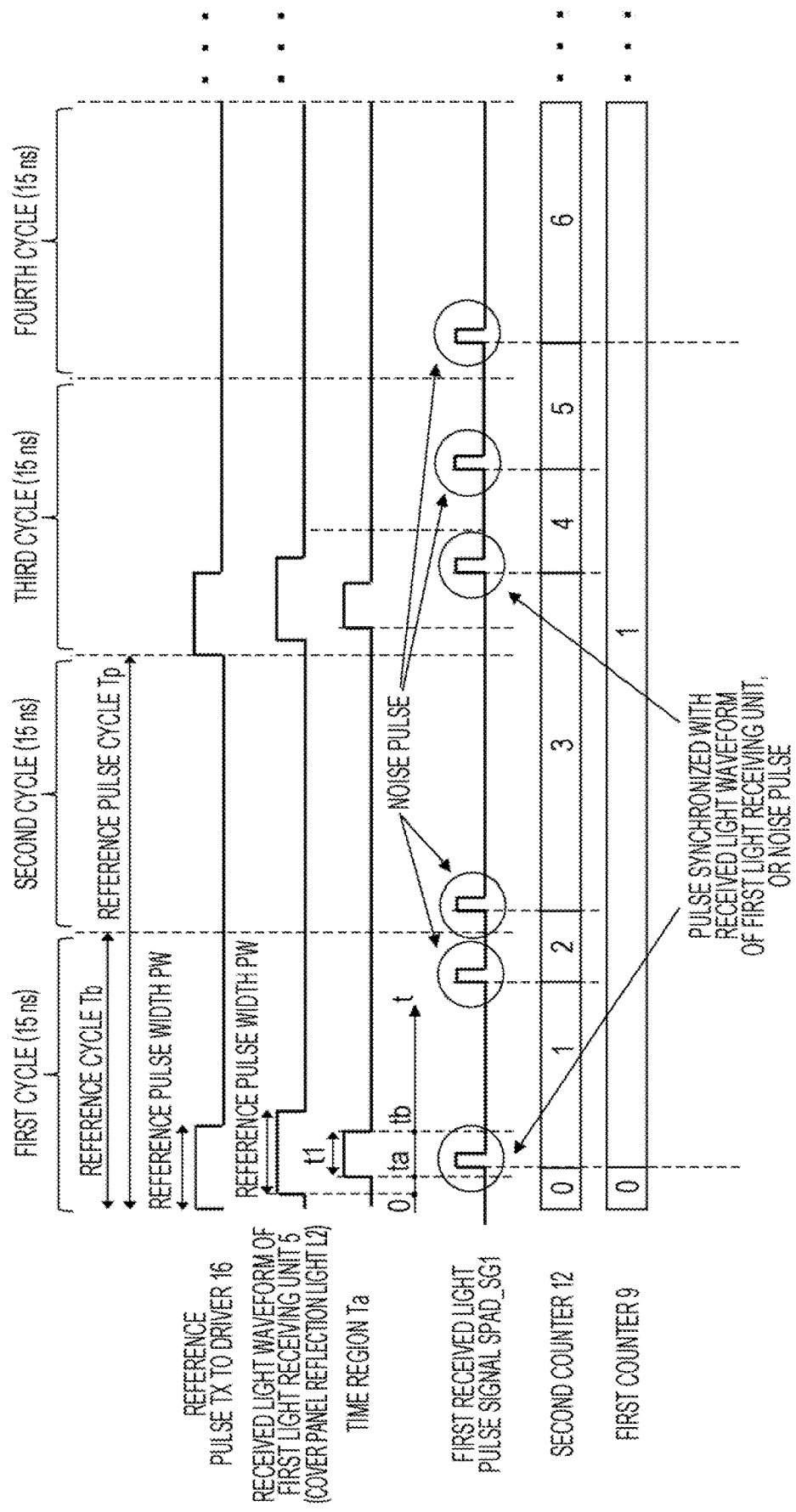
FIG. 8C is a graph for explaining a case where a reference cycle and a reference pulse cycle are different.

FIG. 8C illustrates the case where the reference cycle Tb and the reference pulse cycle Tp are different (reference pulse cycle Tp=reference cycle Tb×2). (Different from the example illustrated in FIGS. 6, 8A and 8B) In a case where the reference pulse cycle Tp is twice the reference cycle Tb, the reference pulse TX to the driver 16, the received light waveform (component of the cover panel reflection light L2) of the first light receiving unit 5, and the time domain Ta occur every two cycles of the reference cycle Tb. In the case where the reference pulse cycle Tp is n times the reference cycle Tb, all of the reference pulse TX to the driver 16, the received light waveform of the first light receiving unit 5, and the time domain Ta occur every n cycles of the reference cycle Tb.

Next, the operation in the case where the target 19 other than the cover panel 4 is present in front of the optical sensor 1 is considered.

Figure 9:
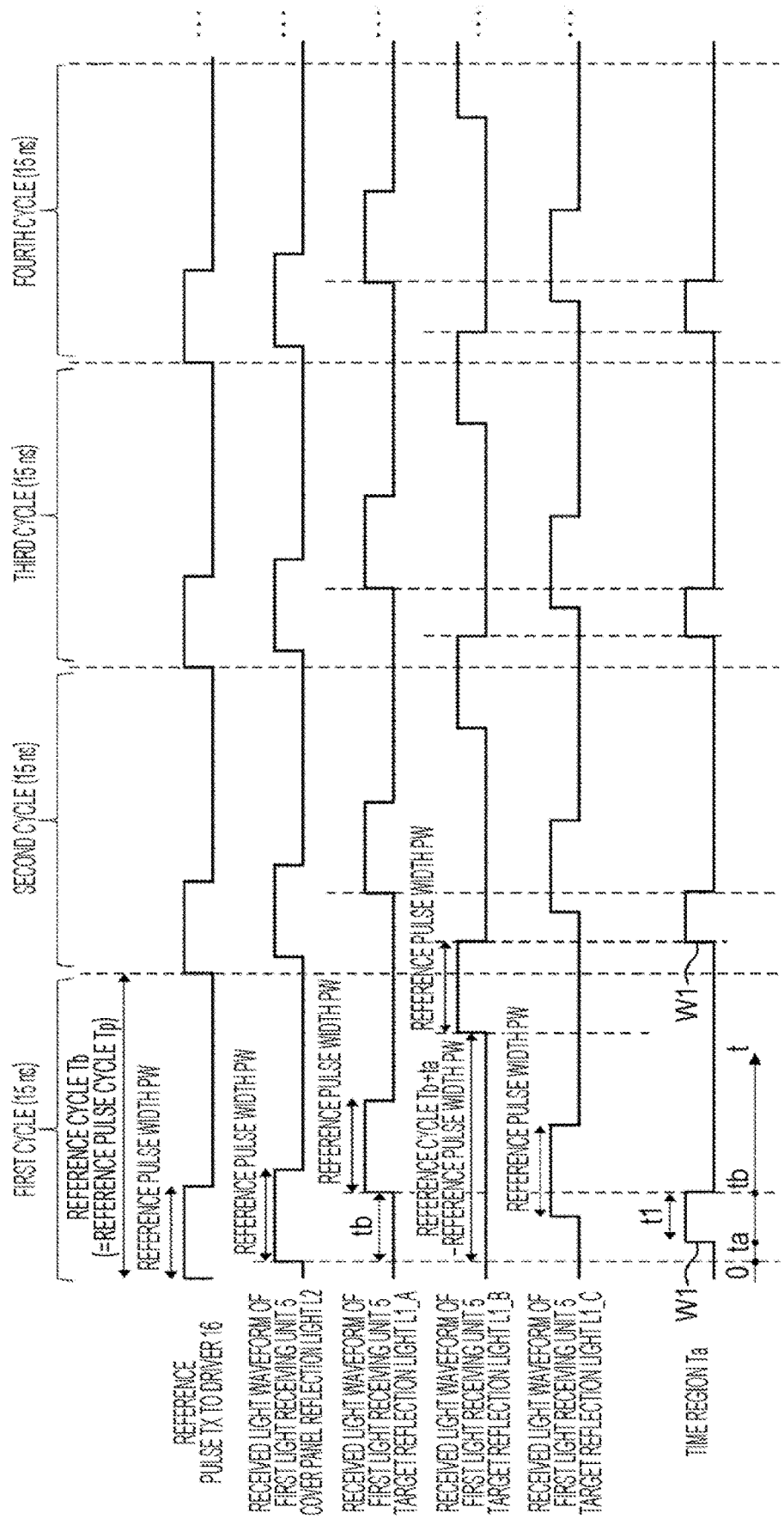
FIG. 9 is a graph illustrating the reflection light component from the cover panel and the reflection light component from the detection target in the light emission period, in the case where the reflection light component from the detection target is classified into three cases (A to C) of reflection light components.

FIG. 9 illustrates the component of the cover panel reflection light L2 and the components of target reflection lights L1_A, L1_B, and L1_C in the three cases in the light emission period T3.

The target reflection lights L1_A, L1_B, and L1_C have different distances from the target 19, and represent received light waveforms of the first light receiving unit 5 having time delays corresponding to the distances.

In a case where the target reflection light L1_C is received from the target 19, the reference pulse width PW overlaps at least a part of the time width t1 of the time domain Ta. For that reason, the third output pulse number C3 calculated by the first counter 9 through the light emission period T3 and the non-light emission period T4 within the measurement period is the count value in which not only the component of the cover panel reflection light L2 but also the target reflection light L1 is also mixed. Accordingly, if the third output pulse number C3 is substituted into Expression (3), a crosstalk value that is larger than the correct crosstalk value is output and the crosstalk value calculation circuit 11 may not calculate an accurate crosstalk value.

In a case where the target reflection light L1_A or the target reflection light L1_B is received from the target 19, the reference pulse width PW does not overlap the time width t1 of the time domain Ta. For that reason, the third output pulse number C3 calculated by the first counter 9 through the light emission period T3 and the non-light emission period T4 within the measurement period is only the component of the cover panel reflection light L2. Accordingly, the crosstalk value calculation circuit 11 can calculate the correct crosstalk value by substituting the third output pulse number C3 into Expression (3).

In FIG. 9, in a case where the detection target 19 is present between the position corresponding to the target reflection light L1_A and the position corresponding to the target reflection light L1_B, the reference pulse width PW does not overlap the time width t1 of the time domain Ta. For that reason, in a case where the target 19 to be detected is present at a distance corresponding to the time difference which is equal to or more than the time tb and equal to or less than (reference cycle Tb+time ta−reference pulse width PW) at time ta<time tb, the crosstalk value calculation circuit 11 can calculate the correct crosstalk value by Expression (3) for the component (at distance of substantially 0) of the cover panel reflection light L2.

In order to determine whether or not the target 19 to be detected is present at a distance corresponding to the time difference which is equal to or more than the time tb and equal to or less than (reference cycle Tb+time ta−reference pulse width PW) at time ta<time tb, a method of using the result of the time difference extracted by the time difference extraction circuit 7 is considered. However, in a case where the component of the cover panel reflection light L2 is present, the rising edge position of the delayed signal DLL1_PULSE in the locked state of the first DLL circuit 25 is different (the position in the locked state is equal in the second DLL circuit 26 because there is no component of the cover panel reflection light L2) depending on the magnitude relationship between the component of the cover panel reflection light L2 and the component of the target reflection light L1, and the crosstalk value calculation circuit 11 may not perform correct time difference extraction (FIGS. 4A and 4B). The waveform (received light waveform) when the second light receiving unit 6 receives light is a waveform which contains two waveforms of a waveform representing the component of the cover panel reflection light L2 from the cover panel 4 and a waveform representing component (including direct light) of the reflection light from the inside of the sensor package. However, since the distances on the spatial light path are both substantially equal to 0, the waveforms are equal to the received light waveforms in FIG. 4A.

Figure 10A:
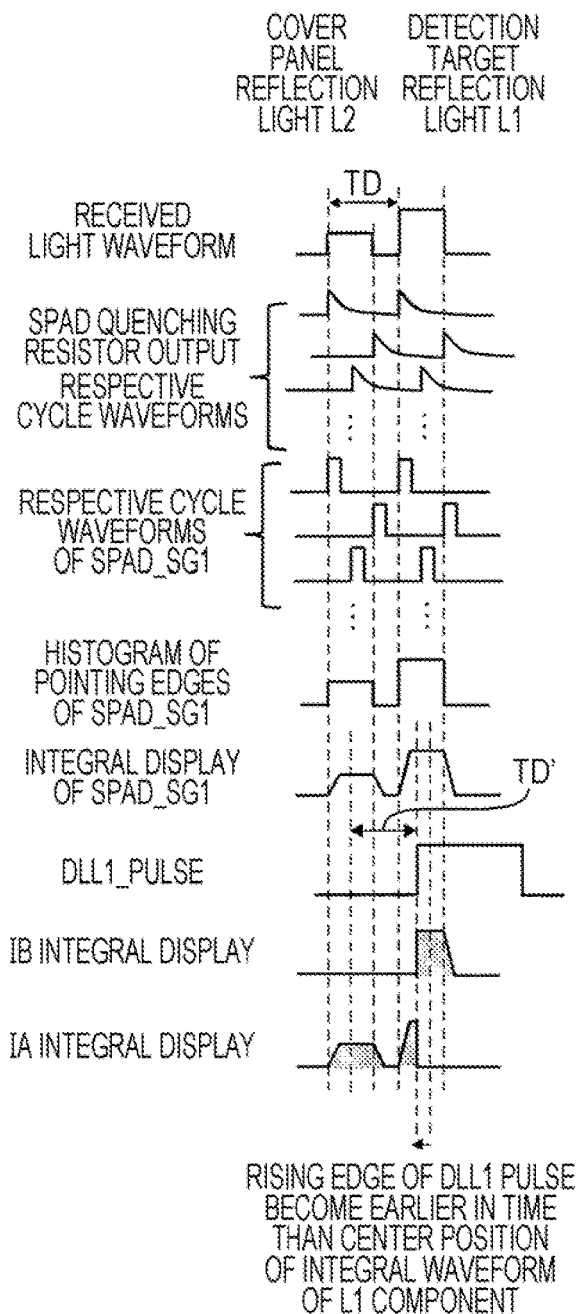
Figure 10B:
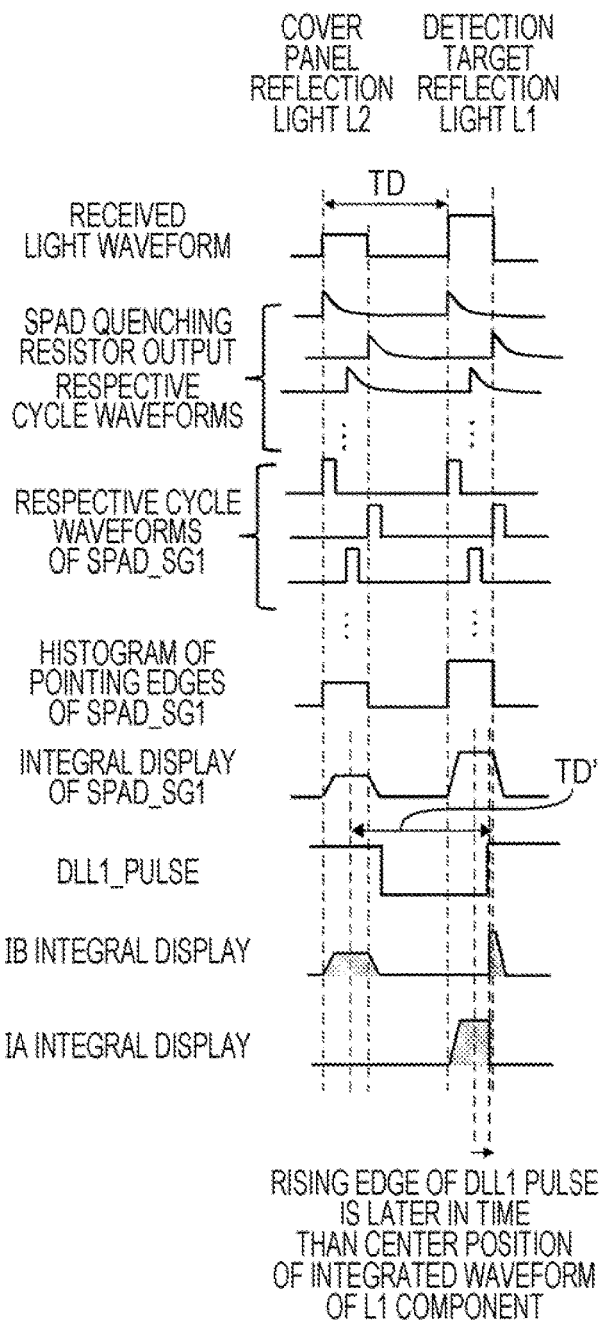

FIGS. 10A and 10B are waveform diagrams of a locked state of the first DLL circuit 25 in a case where the time difference TD (time difference corresponding to the distance to the target 19 to be detected) between the received light waveform of the target reflection light L1 component and the received light waveform of the cover panel reflection light L2 component is smaller than the half cycle of the reference cycle Tb (FIG. 10A) and a case where the time difference TD is larger than the half cycle of the reference cycle Tb (FIG. 10B).

In the case where the component of the reflection light L2 of the cover panel is not present, the locked state is obtained (FIG. 4A) in which the integrated value of IB in the IB integral display coincides with the integrated value of IA in the IA integral display at the center position of the integral display waveform of the first received light pulse signal SPAD_SG1 of the component of the object reflection light L1. However, in a case where the component of the cover panel reflection light L2 is present and the time difference TD of the received light waveform is smaller than the half cycle of the reference cycle Tb (FIG. 10A), the rising edge position of the DLL1_PULSE becomes earlier in time than the center position of the integral display waveform of the first received light pulse signal SPAD_SG1 of the component of the target reflection light L1. A time difference TD' between the center position of the integral display waveform of the component of the cover panel reflection light L2 and the rising edge position of DLL1_PULSE becomes smaller than the time difference TD. In a case where the time difference TD of the received light waveform is larger than the half cycle of the reference cycle Tb (FIG. 10B), the rising edge position of the DLL1_PULSE becomes later in time than the center position of the integral display waveform of the first received light pulse signal SPAD_SG1 of the component of the target reflection light L1. The time difference TD' between the center position of the integral display waveform of the component of the cover panel reflection light L2 and the rising edge position of DLL1_PULSE becomes larger than the time difference TD.

The second DLL circuit 26 receives the cover panel reflection light L2 and the second received light pulse signal SPAD_SG2 from the second light receiving unit 6 due to reflection light (including direct light) from the inside of the sensor package, and is locked at the center position of the integral waveform of the component of the cover panel reflection light L2 and the reflection light (including direct light) from the inside of the sensor package. Since the reflection light from the inside of the sensor package corresponds to the same distance (almost zero distance) as the component of the cover panel reflection light L2, the time difference TD' between the integral waveform center position of the component of the cover panel reflection light L2 received by the first light receiving unit 5 and the rising edge position of DLL1_PULSE and the time difference extracted from the time difference extraction circuit 7 become equal time difference. Accordingly, the result of the time difference extracted by the time difference extraction circuit 7 is equal to the time difference TD'.

That is, in a case where the time difference TD is smaller than the half cycle of the reference cycle Tb, the result of the time difference extracted by the time difference extraction circuit 7 is smaller than the time difference corresponding to the true distance. In a case where the time difference TD is larger than the half cycle of the reference cycle Tb, the result of the time difference extracted by the time difference extraction circuit 7 is larger than the time difference corresponding to the true distance.

In other words, in the case where the result of the time difference extracted by the time difference extraction circuit 7 is smaller than the half cycle of the reference cycle Tb, the time difference TD is smaller than the half cycle of the reference cycle Tb, and in the case where the time difference is larger than the half cycle of the reference cycle Tb, the time difference TD is larger than the half cycle of the reference cycle Tb.

The In a case where the time tb is set so that time tb≤reference cycle Tb/2, as a method of determining whether or not the target 19 is present at a distance which corresponds to the time difference equal to or greater than the time tb and equal to or less than the time difference (reference cycle Tb+time ta−reference pulse width PW) at time ta<time tb, for example, when the time difference extraction result of the time difference extraction circuit 7 reaches the value of the time tb, the time tb is smaller than the half cycle of the reference cycle Tb, so that the time difference TD corresponds to a time difference larger than the time tb. Even in a case where the time difference extraction result is equal to or larger than the time tb and equal to or smaller than the reference cycle Tb/2, the time difference TD corresponds to a time difference larger than the time tb.

In the case where (reference cycle Tb+time ta−reference pulse width PW) is set so that (reference cycle Tb+time ta−reference pulse width PW)≥reference cycle Tb/2, for example, when the time difference extraction result of the time difference extraction circuit 7 becomes (reference cycle Tb+time ta−reference pulse width PW), (reference cycle Tb+time ta−reference pulse width PW) is larger than the half cycle of the reference cycle Tb, so that the time difference TD corresponds to a time difference smaller than ((reference cycle Tb+time ta−reference pulse width PW)).

Even in a case where the time difference extraction result is equal to or larger than the reference cycle Tb/2 and is equal to or smaller than (reference cycle Tb+time ta−reference pulse width PW), the time difference TD corresponds to a time difference smaller than ((reference cycle Tb+time ta−reference pulse width PW)).

That is, when the waveform W1 in the time domain Ta is present in the time domain from the time ta to the time tb (the time ta<the time tb) that satisfies time tb≤reference cycle Tb/2≤(reference cycle Tb+time ta−reference pulse width PW), if the time difference t2 extracted by the time difference extraction circuit 7 is present within a range satisfying time tb≤time difference t2≤reference cycle Tb+time ta−reference pulse width PW, since the time difference TD (time difference corresponding to the distance to the target 19 to be detected) is equal to or larger than the time tb and is within (reference cycle Tb+time ta−reference pulse width PW), the determination circuit 8 can determine that the crosstalk value can be calculated. As a result, the crosstalk value calculation circuit 11 can calculate the crosstalk value from Expression (3).

The crosstalk value calculation circuit 11 can update the latest crosstalk value each time the extraction result of the time difference t2 within the range described above is obtained, while performing the distance measurement. As a result, the optical sensor 1 can follow fluctuation of the crosstalk value due to fingerprint contamination of the cover panel 4 or the like.

If the correct crosstalk value (count value of the component of the cover panel reflection light L2) can be acquired, the distance calculation circuit 14 can correct and calculate the correct distance from the optical sensor 1 to the target 19 using the crosstalk value, the sixth output pulse number C6 (count value of the component of the target reflection light L1+count value of the component of the cover panel reflection light L2), and the extraction result of the time difference t2.

Embodiment 2

Another embodiment of the disclosure will be described with reference to FIGS. 11 and 12A to 12D. For convenience of explanation, members having the same functions as the members described in the embodiment described above are denoted by the same reference numerals, and description thereof is omitted.

Figure 11:
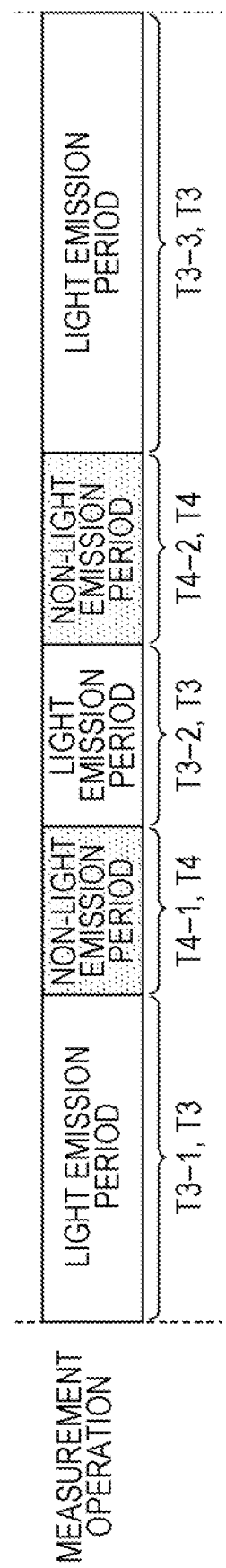
FIG. 11 is a view illustrating a light emission period and a non-light emission period of an optical sensor according to Embodiment 2.

FIG. 11 is a view illustrating the light emission period T3 and the non-light emission period T4 of the optical sensor according to Embodiment 2. As compared with Embodiment 1, other configurations are the same as those in Embodiment 1 except that the light emission period T3 is divided into a plurality of periods and the non-light emission period T4 is divided into a plurality of periods.

In Embodiment 2, as illustrated in FIG. 11, the light emission period T3 and the non-light emission period T4 are respectively divided and performed alternately. Specifically, the light emission period T3 is divided into three light emission periods T3-1, T3-2, and T3-3. The non-light emission period T4 is divided into two non-light emission periods T4-1 and T4-2. The divided light emission periods T3-1, T3-2, and T3-3 and the non-light emission periods T4-1 and T4-2 are alternately performed as illustrated in FIG. 11.

The total of the light emission periods T3 is (T3=(T3-1)+(T3-2)+(T3-3)). The total of the non-light emission period T4 is (T4=(T4-1)+(T4-2)). The ratio between the light emission period T3 and the non-light emission period T4 in the measurement operation is determined by a prescribed time ratio.

It is desirable that a measurement interval in the light emission period T3 and a measurement interval in the non-light emission period T4 are set as short as possible to the extent that a measurement environment does not change in order to improve measurement accuracy in a disturbance light environment.

As described above, it is possible to further shorten the measurement time of each of the light emission period T3 and the non-light emission period T4 by performing measurement by dividing the light emission period T3 and the non-light emission period T4, as compared with the case where measurement is performed one light emission period T3 by one non-light emission period T4 without dividing the light emission period T3 and the non-light emission period T4.

FIGS. 12A to 12D are views for explaining the start emission period T3s, the end emission period T3e, the start non-light emission period T4s, and the end non-light emission period T4e of the optical sensor 1.

When measurement is performed by dividing the light emission period and non-light emission period, the measurement is ended in the light emission period at the time of starting from the light emission period as illustrated in FIG. 12A and the measurement is ended in the non-light emission period at the time of starting from the non-light emission period as illustrated in FIG. 12B, so that it is possible to improve measurement accuracy in an environment in which the amount of disturbance light changes linearly with time.

As described above, the light emission period T3 is divided into at least two of the start light emission period T3s at which measurement is performed first and the end light emission period T3e at which measurement is performed last, or the non-light emission period T4 is divided into at least two of the start non-light emission period T4s at which measurement is performed first and the end non-light emission period T4e at which measurement is performed last.

In FIG. 12A, it is assumed that the total time of the light emission period T3s and the light emission period T3e is equal to the non-light emission period T4. In the case where the disturbance light intensity is in the state A illustrated in FIG. 12C, the noise pulse generation frequency due to disturbance light in the light emission period T3s is low and the noise pulse generation frequency due to the disturbance light in the light emission period T3e is high. The noise pulse generation frequency due to disturbance light in the non-light emission period T4 is an intermediate value between the light emission period T3s and the light emission period T3e. For that reason, in the result of subtracting the count value in the non-light emission period T4 from the count value in the light emission periods T3s and T3e, the count value based on the noise pulse component due to disturbance light can be removed.

In the case where disturbance light intensity is in the state B illustrated in FIG. 12D, the occurrence frequency of the noise pulse due to the disturbance light in the light emission period T3s is high and the occurrence frequency of the noise pulse due to the disturbance light in the light emission period T3e is low. The noise pulse occurrence frequency due to the disturbance light in the non-light emission period T4 is an intermediate value between the light emission period T3s and the light emission period T3e. For that reason, similarly to the state A, it is possible to remove the count value based on the noise pulse component due to the disturbance light in the result of subtracting the count value in the non-light emission period T4 from the count value in the light emission period T3s and T3e.

It is self-evident that the same effect is obtained also in the case of FIG. 12B in which the light emission period T3 and the non-light emission period T4 are exchanged.

In Embodiments 1 and 2, in the DLL method, even in a case where the target 19 is present in front of the optical sensor 1, many counters are not demanded, and if the time difference of the time difference extraction circuit 7 in the optical sensor 1 is within a fixed value range from the time difference corresponding to the half cycle of the reference cycle Tb, it is possible to update the crosstalk value so that correct distance measurement can be performed even when the cover panel 4 is present.

Embodiment 3

Figure 13A:
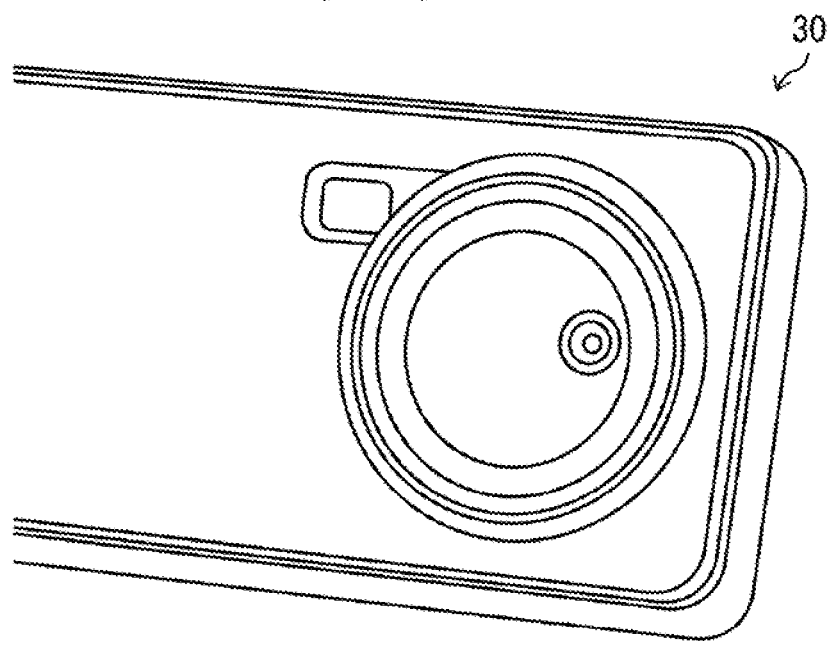
FIG. 13A is a perspective view illustrating external appearance of a smartphone according to Embodiment 3.
Figure 13B:
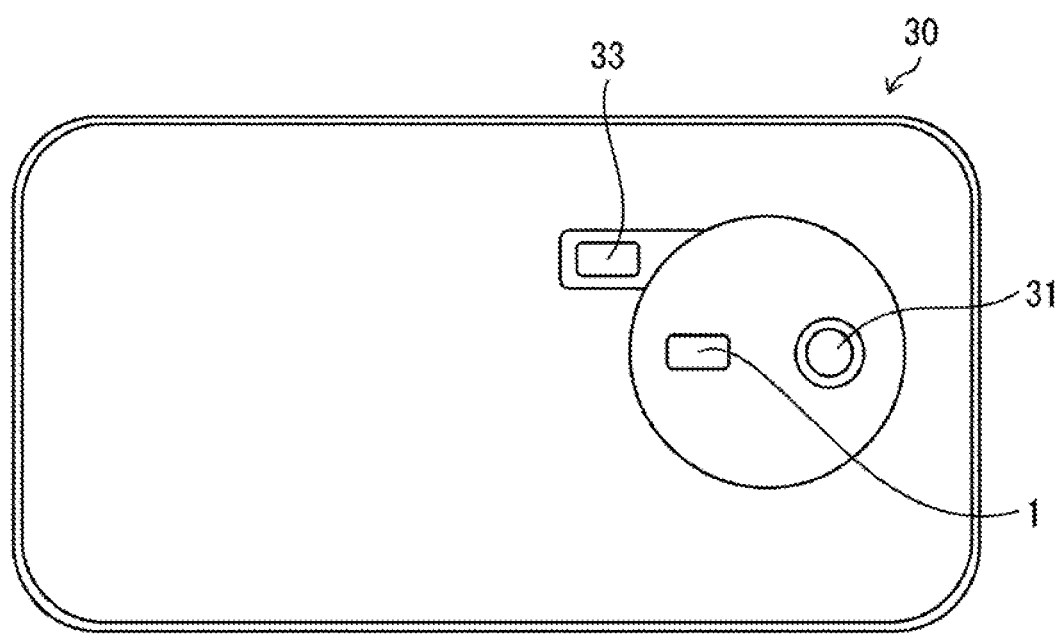
FIG. 13B is a front view of the smartphone.
Figure 14:
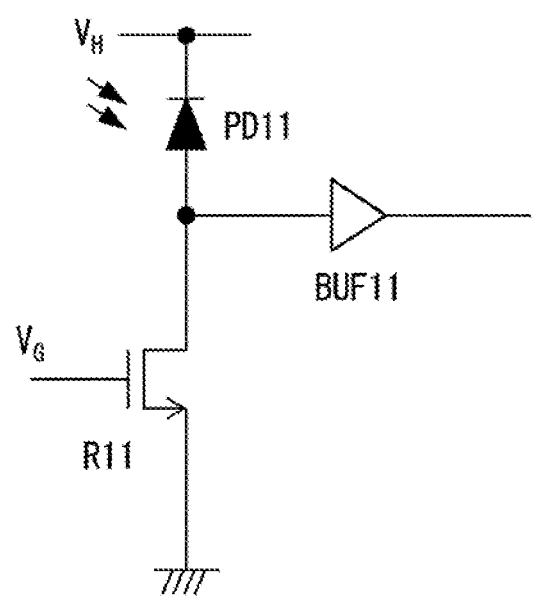
FIG. 14 is a circuit diagram illustrating a configuration example of a light receiving unit using a Geiger-mode avalanche photodiode.

FIG. 13A is a perspective view illustrating an appearance of a smartphone 30 according to Embodiment 3, and FIG. 13B is a front view of the smartphone 30. The optical sensor 1 according to Embodiments 1 and 2 can be provided in the smartphone 30 (electronic device). The smartphone 30 includes a camera 31 for capturing a target, a flash 33 for illuminating the target to be captured by the camera 31, an optical sensor 1 (TOF sensor) for detecting the distance to the target to be captured by the camera 31. With this, it is possible to accurately detect the distance to the target demanded for an autofocus function of the camera 31.

Summing-Up

According to Aspect 1 of the disclosure, there is provided the optical sensor 1 including the reference pulse generation circuit 2 that generates the reference pulse signal TX, the light emitting element 3 that emits light toward the target 19 based on the reference pulse signal TX, the cover panel 4 that transmits a part of the light and reflects the other part of the light, the photo-count type first light receiving element (first light receiving unit 5) that is provided so as to receive target reflection light L1 reflected by the target 19 and cover panel reflection light L2 reflected by the cover panel 4, the photo-count type second light receiving element (second light receiving unit 6) that is disposed closer to the light emitting element 3 than the first light receiving element (first light receiving unit 5) and receives the cover panel reflection light L2, reflection light from inside a sensor package, and direct light from the light emitting element 3, the time difference extraction circuit 7 that extracts the time difference based on the distance on a spatial light path to the target 19 on the basis of the first received light pulse signal SPAD_SG1 from the first light receiving element (first light receiving unit 5), the reference cycle Tb based on the reference pulse signal TX, and the second received light pulse signal SPAD_SG2 from the second light (second light receiving unit 6), and the determination circuit 8 that determines, based on the time difference extracted by the time difference extraction circuit and the reference cycle Tb, whether it is possible to calculate the crosstalk value representing the component amount of the cover panel reflection light L2.

According to the configuration described above, since the crosstalk value can be calculated when the time difference is within a certain range from the time difference corresponding to the half cycle of the reference cycle, the distance can be correctly measured even in a case where the cover panel is present.

In Aspect 1, the optical sensor 1 according to Aspect 2 of the disclosure may further include the first counter 9 that calculates the number of first received light pulse signals SPAD_SG1 from the first light receiving element (first light receiving unit 5) within the time width t1 of the time domain Ta within the reference pulse width PW including a part or all of the pulse width time domain in which the first light receiving element (first light receiving unit 5) receives cover panel reflection light L2 from the cover panel 4, the first calculation circuit 10 that calculates the third output pulse number C3 from the first light receiving element (first light receiving unit 5) due to incidence of the cover panel reflection light L2 based on the first output pulse number C1 from the first light receiving element (first light receiving unit 5) due to incidence of light including the cover panel reflection light L2 and disturbance light in the light emission period T3, the second output pulse number C2 from the first light receiving element (first light receiving unit 5) due to incidence of disturbance light in the non-light emission period T4, and the ratio between the light emission period T3 and the non-light emission period T4 of the light emitting element 3, and the crosstalk value calculation circuit 11 that calculates the crosstalk value based on the third output pulse number C3, and in which the crosstalk value calculation circuit 11 may calculate the crosstalk value according to third output pulse number×(reference cycle×reference pulse width PW/reference pulse cycle)/(t1×x/100) when the proportion of the time domain in which the first light receiving element (first light receiving unit 5) receives the cover panel reflection light L2 is x % within the time width t1 of the time domain Ta.

According to the configuration described above, it is possible to calculate the crosstalk value with a simple configuration.

In Aspect 1 or 2, the optical sensor 1 according to Aspect 3 of the disclosure, when the time domain Ta is in a time domain from time ta to tb (ta<tb), which satisfies tb≤reference cycle/2≤(reference cycle+ta−reference pulse width PW), in a case where the time at which the first light receiving element (first light receiving unit 5) starts receiving the head of the pulsed light of the cover panel reflection light L2 from the cover panel 4 is the starting point (0s) in each cycle of the reference pulse cycle, the determination circuit may determine that crosstalk can be calculated in a case where the time difference t2 extracted by the time difference extraction circuit is within the range of tb≤t2≤reference cycle+ta−reference pulse width PW.

According to the configuration described above, it is possible to calculate the count value (crosstalk value) of the amount of reflection light component by the cover panel without being affected by the count value by the detection target.

In Aspect 2, the optical sensor 1 according to Aspect 4 of the disclosure may further include the second counter 12 that calculates the number of pulse outputs from the first light receiving element (first light receiving unit 5), the second calculation circuit 13 that calculates the sixth output pulse number C6 from the first light receiving element (first light receiving unit 5) due to incidence of the cover panel reflection light L2 based on the fourth output pulse number C4 from the first light receiving element (first light receiving unit 5) due to incidence of light including the cover panel reflection light L2 and disturbance light in the light emission period T3, the fifth output pulse number C5 from the first light receiving element (first light receiving unit 5) due to incidence of disturbance light in the non-light emission period T4, and the ratio between the light emission period T3 and the non-light emission period T4 of the light emitting element 3, and the distance calculation circuit 14 that calculates the distance to the target 19 based on the sixth output pulse number C6 calculated by the second calculation circuit 13, the time difference extracted by the time difference extraction circuit 7, and the crosstalk value calculated by the crosstalk value calculation circuit 11.

According to the configuration described above, even in a case where the crosstalk value is present, the optical sensor can output the correct distance to the detection target.

In any one of Aspects 1 to 4, in the optical sensor 1 according to Aspect 5 of the disclosure, the light emission period T3 and the non-light emission period T4 are divided to be alternately allotted for measurement in a prescribed period so that the ratio between the light emission period T3 and the non-light emission period T4 is a prescribed ratio.

According to the configuration described above, calculation accuracy of the count value (crosstalk value) of the amount of reflection light component by the cover panel at the time of disturbance light irradiation can be improved.

In Aspect 5, in the optical sensor 1 according to Aspect 6 of the disclosure, the light emission period T3 may be divided into at least two of the start light emission period T3s to be allotted first for measurement and the end light emission period T3e to be allotted last for measurement, or the non-light emission period T4 may be divided into at least two of the start non-light emission period T4s to be allotted first for measurement and the end non-light emission period T4e to be allotted last for measurement.

According to the configuration described above, calculation accuracy of the count value (crosstalk value) of the amount of reflection light component by the cover panel at the time of disturbance light irradiation can be improved.

According Aspect 7 of the disclosure, there is provided an electronic apparatus including the optical sensor 1 according to any one of Aspects 1 to 6.

The present disclosure is not limited to the embodiments described above, and various modifications are possible within the scope indicated in the claims and embodiments obtained by appropriately combining technical means disclosed in different embodiments are also included in the technical scope of the disclosure. Furthermore, new technical features can be formed by combining technical means disclosed in each embodiment.

The present disclosure contains subject matter related to that disclosed in Japanese Priority Patent Application JP 2017-219263 filed in the Japan Patent Office on Nov. 14, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical sensor comprising:
a reference pulse generation circuit that generates a reference pulse signal;
a light emitting element that emits light toward a target based on the reference pulse signal;
a cover panel that transmits a part of the light and reflects the other part;
a photo-count type first light receiving element that is provided so as to receive target reflection light reflected by the target and cover panel reflection light reflected by the cover panel;
a photo-count type second light receiving element that is disposed closer to the light emitting element than the first light receiving element and receives the cover panel reflection light, reflection light from inside a sensor package, and direct light from the light emitting element;
a time difference extraction circuit that extracts a time difference based on a distance on a spatial light path to the target on the basis of a first received light pulse signal from the first light receiving element, a reference cycle based on the reference pulse signal, and a second received light pulse signal from the second light receiving element; and
a determination circuit that determines, based on the time difference extracted by the time difference extraction circuit and the reference cycle, whether a crosstalk value representing a component amount of the cover panel reflection light is calculated.

2. The optical sensor according to claim 1, further comprising:
a first counter that calculates the number of first received light pulse signals from the first light receiving element within a time width of a time domain within a reference pulse width including a part or all of a pulse width time domain in which the first light receiving element receives the cover panel reflection light from the cover panel;
a first calculation circuit that calculates a third output pulse number from the first light receiving element due to incidence of the cover panel reflection light based on a first output pulse number from the first light receiving element due to incidence of light including the cover panel reflection light and disturbance light in a light emission period, a second output pulse number from the first light receiving element due to incidence of disturbance light in a non-light emission period, and a ratio between the light emission period and the non-light emission period of the light emitting element; and
a crosstalk value calculation circuit that calculates the crosstalk value based on the third output pulse number,
wherein the crosstalk value calculation circuit calculates the crosstalk value by third output pulse number x(reference cycle×reference pulse width PW/reference pulse cycle)/(t1×x/100), when a proportion of the time domain in which the first light receiving element receives the cover panel reflection light is x % within the time width of the time domain.

3. The optical sensor according to claim 2,
wherein when the time domain is in a time domain from time ta to tb (ta<tb), which satisfies tb≤reference cycle/2≤(reference cycle+ta −reference pulse width), in a case where the time at which the first light receiving element starts receiving a head of a pulsed light of the cover panel reflection light from the cover panel is the starting point (0s) in each cycle of the reference pulse cycle, the determination circuit determines that crosstalk is calculated in a case where a time difference t2 extracted by the time difference extraction circuit is within a range of tb≤t2 ≤reference cycle+ta−reference pulse width.

4. The optical sensor according to claim 2, further comprising:
a second counter that calculates the number of pulse outputs from the first light receiving element;
a second calculation circuit that calculates a sixth output pulse number from the first light receiving element due to incidence of the cover panel reflection light based on a fourth output pulse number from the first light receiving element due to incidence of light including the cover panel reflection light and the disturbance light in the light emission period, a fifth output pulse number from the first light receiving element due to incidence of disturbance light in the non-light emission period, and the ratio between the light emission period and the non-light emission period of the light emitting element; and
a distance calculation circuit that calculates a distance to the target based on the sixth output pulse number calculated by the second calculation circuit, the time difference extracted by the time difference extraction circuit, and the crosstalk value calculated by the crosstalk value calculation circuit.

5. The optical sensor according to claim 2,
wherein the light emission period and the non-light emission period are divided to be alternately implemented in a prescribed period so that the ratio between the light emission period and the non-light emission period is a prescribed ratio.

6. The optical sensor according to claim 5,
wherein the light emission period is divided into at least two of a start light emission period to be implemented first and an end light emission period to be implemented last, or the non-light emission period is divided into at least two of a start non-light emission period to be implemented first and an end non-light emission period to be implemented last.

7. An electronic device comprising:
the optical sensor according to any one of claim 1.

* * * * *